US012679209B2

(12) United States Patent (10) Patent No.: US 12,679,209 B2
Badar et al. (45) Date of Patent: Jul. 14, 2026

(54) BENDABLE GLASS ARTICLE FOR VEHICLE INTERIOR SYSTEM HAVING IMPROVED HEAD IMPACT PERFORMANCE

(71) Applicant: CORNING INCORPORATED, Corning, NY (US)

(72) Inventors: Amey Ganpat Badar, Hillsboro, OR (US); Evan Gray Kister, Painted Post, NY (US); Balamurugan Meenakshi Sundaram, Painted Post, NY (US); Yousef Kayed Qaroush, Painted Post, NY (US); Jason Scott Stewart, Hornell, NY (US)

(73) Assignee: Corning Incorporated, Corning, NY (US)

( * ) Notice: Subject to any disclaimer, the term of this patent is extended or adjusted under 35 U.S.C. 154(b) by 237 days.

(21) Appl. No.: 18/291,041

(22) PCT Filed: Jul. 21, 2022

(86) PCT No.: PCT/US2022/037773
§ 371 (c)(1),
(2) Date: Jan. 22, 2024

(87) PCT Pub. No.: WO2023/009370
PCT Pub. Date: Feb. 2, 2023

(65) Prior Publication Data
US 2025/0100384 A1 Mar. 27, 2025

Related U.S. Application Data

(60) Provisional application No. 63/226,263, filed on Jul. 28, 2021.

(51) Int. Cl.
*B60K 35/50* (2024.01)
*B60K 35/22* (2024.01)
(Continued)

(52) U.S. Cl.
CPC .............. *B60K 35/80* (2024.01); *B60K 35/22* (2024.01); *B60K 35/50* (2024.01); *B60K 35/53* (2024.01);
(Continued)

(58) Field of Classification Search
CPC ........ B60K 35/80; B60K 35/22; B60K 35/50; B60K 35/53; B60K 35/60; B60K 35/265; B60K 2360/816; Y10T 428/24628
See application file for complete search history.

(56) References Cited

U.S. PATENT DOCUMENTS 10,020,462 B1 * 7/2018 Ai ......................... H10K 59/871
2020/0022267 A1 * 1/2020 Han ......................... B32B 15/18
(Continued)

FOREIGN PATENT DOCUMENTS

WO 2020/081488 A1 4/2020
WO 2020/236457 A1 11/2020
WO 2020/257380 A1 12/2020

OTHER PUBLICATIONS

International Search Report and Written Opinion of the International Searching Authority; PCT/US2022/037773; dated Nov. 17, 2022; 11 pages; European Patent Office.

*Primary Examiner* — Donald M Flores, Jr.
(74) *Attorney, Agent, or Firm* — Daniel J. Greenhalgh

(57) ABSTRACT

Disclosed are embodiments of a glass article for a vehicle interior system. The glass article includes a glass sheet with a first side and a second side. A first frame is disposed on the glass sheet on the first side of the glass sheet, and a second frame disposed on the second side of the glass sheet. A mandrel is disposed between the first frame and the second frame. The mandrel has a flexural rigidity of at least 150 $Pa \cdot m^3$ and a density of at most 2.75 $g/cm^3$. The second side of the glass sheet rotates about the mandrel from a first configuration to a second configuration. In the first configu-
(Continued)

ration, the first side forms a first angle with the second side, and in the second configuration, the first side forms a second angle with the second side. The first angle is different from the second angle.

20 Claims, 16 Drawing Sheets

(51) Int. Cl.
      *B60K 35/53*          (2024.01)
      *B60K 35/60*          (2024.01)
      *B60K 35/80*          (2024.01)
      *B60K 35/26*          (2024.01)
(52) U.S. Cl.
      CPC ............ *B60K 35/60* (2024.01); *B60K 35/265* (2024.01); *B60K 2360/816* (2024.01); *Y10T 428/24628* (2015.01)

(56)                References Cited

U.S. PATENT DOCUMENTS

| | | | |
|---|---|---|---|
| 2021/0029842 | A1 | 1/2021 | Gross et al. |
| 2022/0234447 | A1* | 7/2022 | Benjamin ........... B32B 37/1292 |
| 2023/0202300 | A1 | 6/2023 | Badar et al. |

* cited by examiner

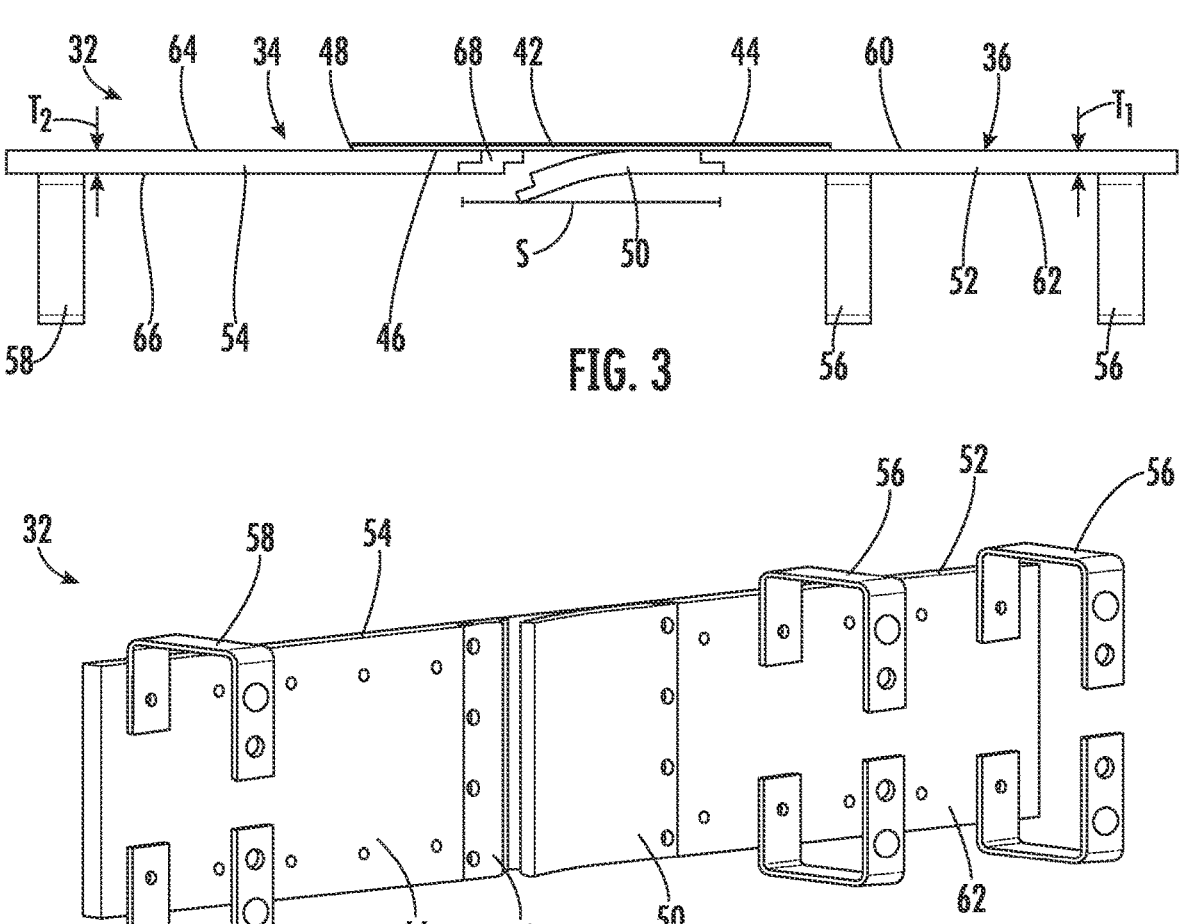
FIG. 3
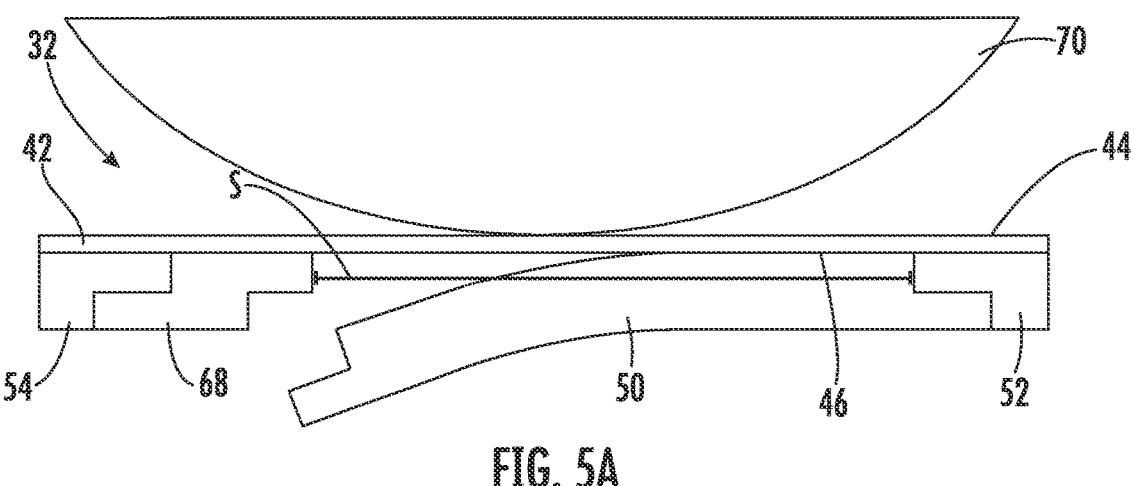
FIG. 4
FIG. 5A

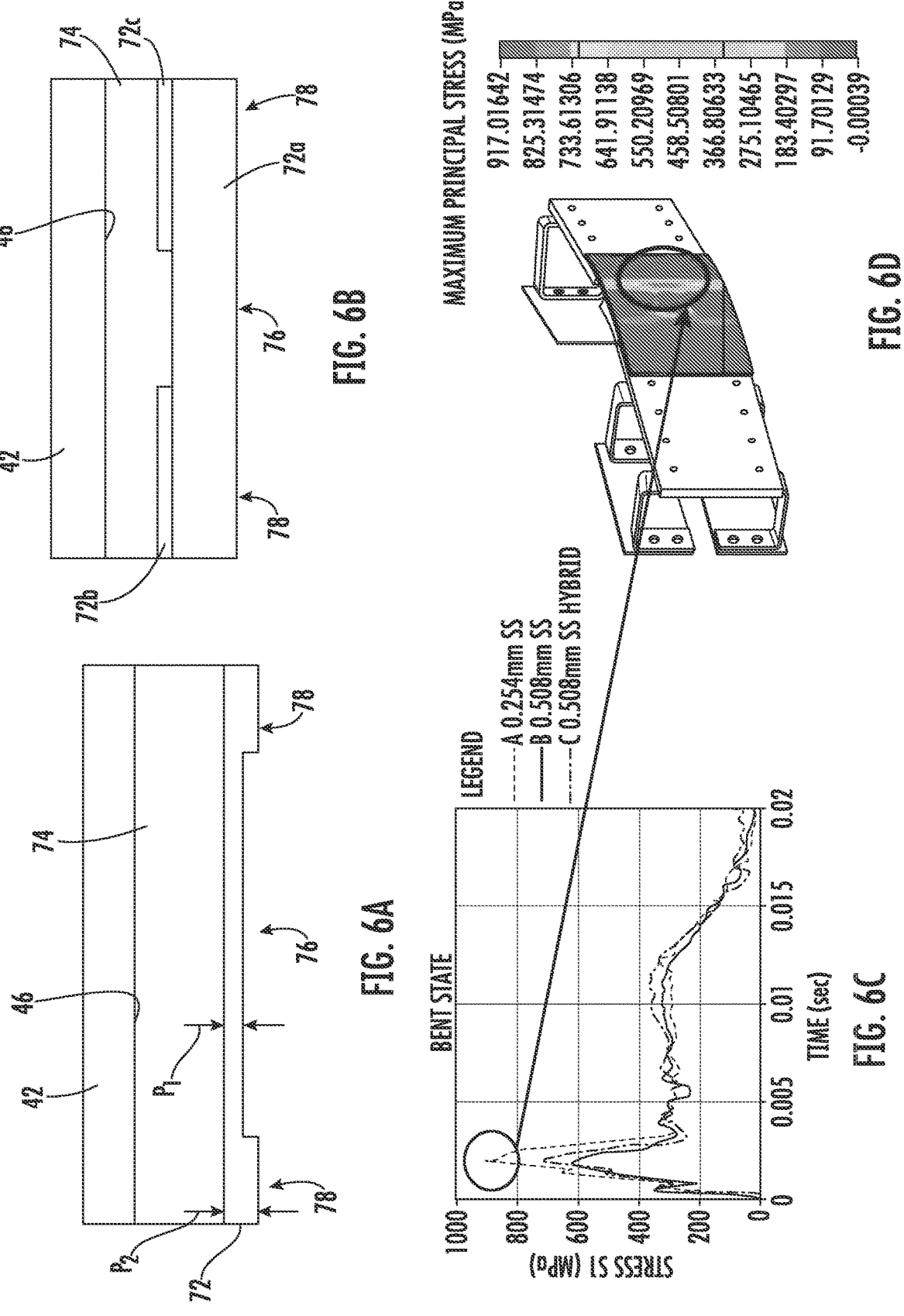

BENDABLE GLASS ARTICLE FOR VEHICLE INTERIOR SYSTEM HAVING IMPROVED HEAD IMPACT PERFORMANCE

This application claims the benefit of priority under 35 U.S.C. § 371 of International Application No. PCT/US2022/037773, filed on Jul. 21, 2022, which claims the benefit of priority under 35 U.S.C. § 119 of U.S. Provisional Application Ser. No. 63/226,263 filed on Jul. 28, 2021, the content of which are relied upon and incorporated herein by reference in their entirety.

BACKGROUND

The disclosure relates to glass articles, and more particularly to a bendable glass article for a vehicle interior system configured to reduce headform acceleration and maximum principal stress on the glass.

Vehicle interiors include a variety of display screens. Efforts have been made to incorporate such display screens into the overall aesthetic design of the vehicle. In this way, attempts have been made to incorporate the displays into continuous surfaces, e.g., of a dashboard. Further, in order to enhance both the aesthetic design and functionality, glass has been used to form these continuous surfaces. However, the use of the glass provides additional design challenges over other conventional plastic, metal, and composite materials, which have had significant time to develop in the automotive industry.

SUMMARY

According to an aspect, embodiments of the disclosure relate to a glass article for a vehicle interior system. In one or more embodiments, the glass article includes a glass sheet having a first major surface and a second major surface opposite to the first major surface. Further, the glass sheet has a first side and a second side. In one or more embodiments, first frame is disposed on the second major surface of the glass sheet on the first side of the glass sheet, and a second frame disposed on the second major surface of the glass sheet on the second side of the glass sheet. In one or more embodiments, a mandrel is disposed between the first frame and the second frame and on the second major surface of the glass sheet. In one or more such embodiments, the mandrel is made of a material having a flexural rigidity of at least 150 Pa·m³ and a density of at most 2.75 g/cm³. In one or more embodiments, the second side of the glass sheet rotates about the mandrel from a first configuration to a second configuration. In the first configuration, the first side forms a first angle with the second side, and in the second configuration, the first side forms a second angle with the second side. In one or more embodiments, the first angle is different from the second angle.

According to another aspect, embodiments of the disclosure relate to a glass article for a vehicle interior system. In one or more embodiments, the glass article includes a glass sheet having a first major surface and a second major surface opposite to the first major surface. Further, the glass sheet has a first side and a second side. In one or more embodiments, a first frame is disposed on the second major surface of the glass sheet on the first side of the glass sheet. In one or more embodiments, a second frame is disposed on the second major surface of the glass sheet on the second side of the glass sheet. In one or more embodiments, a mandrel is disposed between the first frame and the second frame and on the second major surface of the glass sheet. In one or more embodiments, an actuator arm is connected to the second frame, and the second side of the glass sheet rotates about the mandrel from a first configuration to a second configuration via actuation of the actuator arm. In one or more embodiments, the second frame has a proximal end adjacent to the mandrel and a distal end located a position furthest from the mandrel. In one or more such embodiments, the actuator arm is disposed halfway between the distal end and the proximal end or closer to the distal end. In the first configuration, the first side forms a first angle with the second side, and in the second configuration, the first side forms a second angle with the second side. In one or more embodiments, the first angle is different from the second angle.

According to still another aspect, embodiments of the disclosure relate to a glass article for a vehicle interior system. In or more embodiments, the glass article includes a glass sheet having a first major surface and a second major surface opposite to the first major surface. Further, the glass sheet has a first side and a second side. In one or more embodiments, a first frame is disposed on the second major surface of the glass sheet on the first side of the glass sheet, and a second frame is disposed on the second major surface of the glass sheet on the second side of the glass sheet. In embodiments, one or more metal backing plates are disposed between the glass sheet and the first and second frames. In such embodiments, the one or more metal backing plates define a region between the first and second frames having a first thickness less than a second thickness defined by the one or more metal backing plates outside the region. In one or more embodiments, a mandrel is disposed between the first frame and the second frame and on the second major surface of the glass sheet. In such embodiments, the second side of the glass sheet rotates about the mandrel from a first configuration to a second configuration. In the first configuration, the first side forms a first angle with the second side, and in the second configuration, the first side forms a second angle with the second side. In one or more embodiments, the first angle is different from the second angle.

According to yet another aspect, embodiments of the disclosure relate to a glass article for a vehicle interior system. In one or more embodiments, the glass article includes a glass sheet having a first major surface and a second major surface opposite to the first major surface. Further, the glass sheet has a first side and a second side. In one or more embodiments, a first frame is disposed on the second major surface of the glass sheet on the first side of the glass sheet. In one or more such embodiments, the first frame has a first thickness and is comprised of a first material having a first density and a first structure. Further, in one or more such embodiments, a second frame is disposed on the second major surface of the glass sheet on the second side of the glass sheet, and the second frame includes at least one of a second thickness less than the first thickness, a second material having a second density less than the first density, or the first material having a second structure different from the first structure. In one or more embodiments, a mandrel is disposed between the first frame and the second frame and on the second major surface of the glass sheet. In one or more such embodiments, the second side of the glass sheet rotates about the mandrel from a first configuration to a second configuration. In the first configuration, the first side forms a first angle with the second side, and in the second configuration, the first side forms a second angle with the second side. In one or more embodiments, the first angle is different from the second angle.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 depicts a side view of a simplified glass article having a living hinge, according to an exemplary embodiment;

FIG. 4 depicts a rear view of the glass article of FIG. 3, according to an exemplary embodiment;

FIGS. 5A-5D depict simulated and experimental setup and data regarding headform impact testing on a mandrel having various masses, according to exemplary embodiments;

FIGS. 6A-6D depict backing plates having localized thinness in a bend region and data regarding simulated maximum principal stress associated therewith, according to exemplary embodiments;

DETAILED DESCRIPTION

Embodiments of the present disclosure relate to a bendable glass article of a vehicle interior system having improved headform impact performance over a hinge region where the glass article bends. As described herein, various techniques are employed to decrease the peak acceleration experienced by a headform upon impact with the glass article or to decrease the maximum principal stress on the front or back surface of the glass. In this way, the glass articles are configured to meet or exceed relevant safety standards regarding head impact, such as US DOT FMVSS 201. These and other aspects and advantages will be described in relation to the embodiments discussed below and shown in the figures. These embodiments are presented by way of illustration and not by way of limitation.

Figure 1:
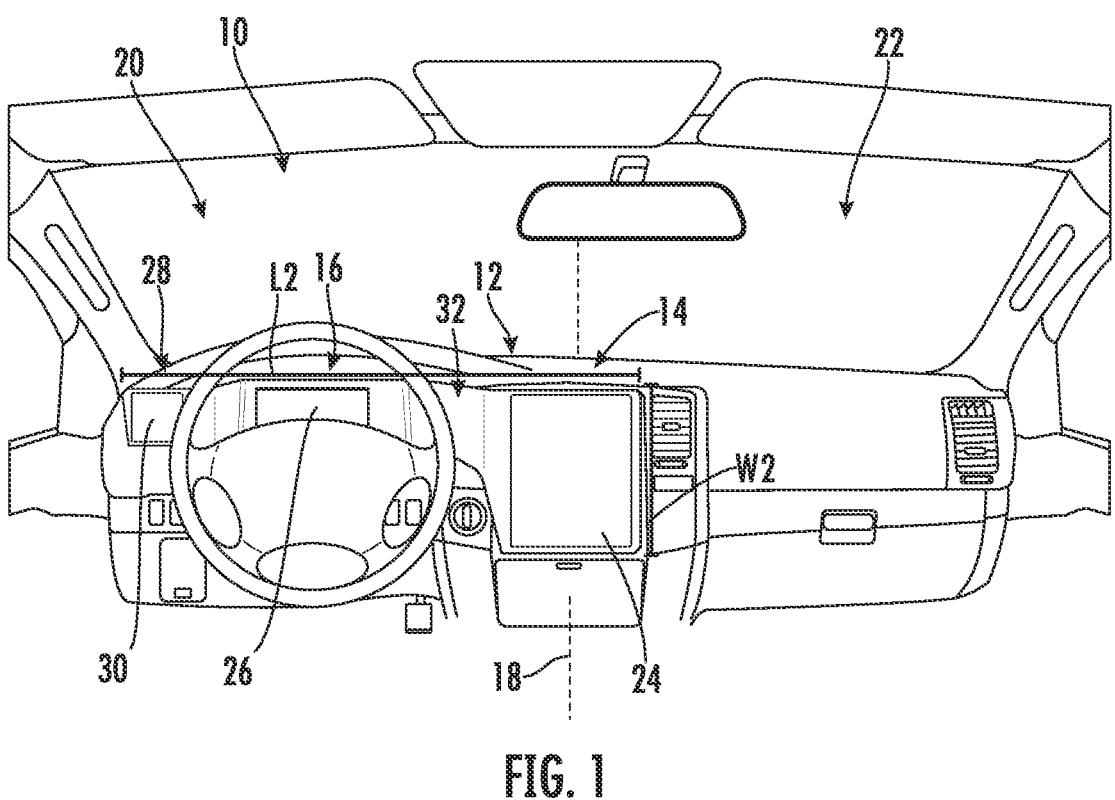
FIG. 1 depicts a vehicle interior including a glass article with a living hinge integrated into a dashboard of the vehicle, according to exemplary embodiments.

FIG. 1 depicts a vehicle interior 10, including a dashboard base 12. In embodiments, the dashboard base 12 includes a center console region 14 and an instrument panel region 16. In general, the dashboard base 12 is disposed across a center line axis 18 of the vehicle. The center line axis 18 divides the vehicle longitudinally between a driver side 20 and a passenger side 22. The instrument panel region 16 is on the driver side 20 of the centerline axis 18, and the center console region 14 may extend across the center line 18 such that the center console region 14 is on both the driver side 20 and the passenger side 22. In embodiments, the center console region 14 includes a first display screen 24, and the instrument panel region 16 includes a second display screen 26. In embodiments, the dashboard base 12 may include one or more additional display regions 28, each including an additional display screen 30.

In embodiments, the first display screen 24 of the center console region 14 is an infotainment center providing information and a control panel to a driver and/or passenger of the vehicle. For example, the first display screen 24 may display vehicle information, GPS directions, climate controls, audio controls, etc. In embodiments, the first display screen 24 may be configured as a touch screen. In embodiments, the second display screen 26 of the instrument panel region 16 may display a speedometer, a fuel gage, a tachometer, a coolant temperature, tire pressure, etc. In embodiments including an additional display screen 30, the additional display screen 30 may display, e.g., views of a front of the vehicle, a rear of the vehicle, or one or more blindspots of the vehicle as captured by a remote camera.

The first display screen 24, the second display screen 26, and the additional display screen 30 (when included) are all incorporated in the same curved glass article 32. As will be discussed below, the second display screen 26 (and additional screen 30) is fixed to the instrument panel region 14 of the dashboard 12, and the first display screen 24 in the center console region 14 is bendable relative to the second display screen 26. In embodiments, the first display screen 24 bends from a first position in which the first display screen 24 is oriented substantially equally between the driver side 20 and the passenger side 22 to a second position in which the first display screen 24 is oriented towards the driver side 20. In order to allow for bending, the glass article 32 has a free end on the first display screen 24 side.

Figure 2:
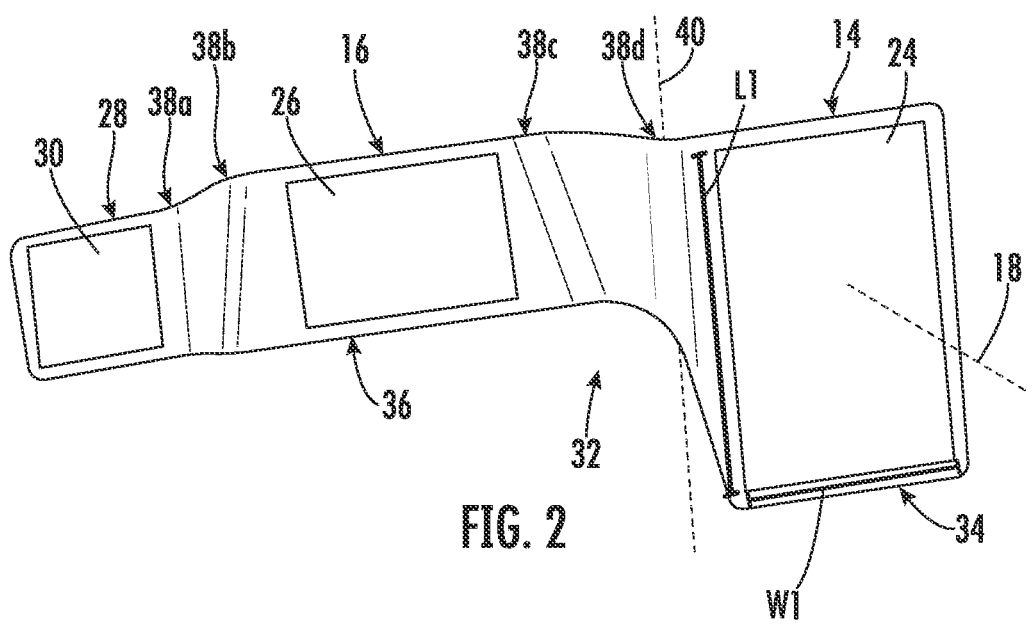
FIG. 2 depicts the glass article of FIG. 1, according to an exemplary embodiment.

FIG. 2 depicts the glass article 32, including the first display screen 24, second display screen 26, and the additional display screen 30. The first display screen 30 is provided on a first side 34 of the glass article 32, and the second display screen 26 and the additional display screen 30 are provided on a second side 36 of the glass article 32. As depicted in the embodiment of FIG. 2, the glass article 32 may include one or more curvatures 38a-d. As shown, the second display screen 26 is disposed behind the first display screen 24 and the additional display screen 30. In this context, "behind" means that the second display screen 26 is in a plane positioned farther from the driver than the planes in which the first display screen 24 and the additional display screen 30 are located. In embodiments, the first display screen 24 and the additional display screen 30 may be located in the same plane, and in other embodiments, the first display screen 24 and the additional display screen 30 may be located in different planes. Further, in embodiments, each plane in which the display screens 24, 26, 30 are located may be parallel to none of the other planes, one of the other planes, or both of the other planes. To achieve the positioning shown in FIG. 2, the glass article 32 includes a first convex curvature 38a and a second concave curvature 38b between the additional display screen 30 and the second display screen 26. Further, the glass article 32 includes a third concave curvature 38c and a fourth convex curvature 38d between the second display screen 26 and the first display screen 24.

As mentioned, the second side 36 of the glass article 32 is fixed to the dashboard base 12, and the first side 34 of the glass article 32 is bendable about a bending axis 40 relative to the second side 36 of the glass article 32. In embodiments, the fourth convex curvature 38d is formed on the bending axis 40. In this way, the first side 34 is bendable such that the fourth convex curvature 38d is variable and, in particular, can be removed from the glass article 32. That is, the first side 34 of the glass article 32 can be bent so that the glass article 32 is substantially planar between the third concave curvature 38c and the first side 34 of the glass article 32.

In embodiments, at least a portion of the second side 36 of the glass article 32 forms an angle of about 180° (i.e., substantially planar) with the first side 34 in the configuration where the first display screen 24 is oriented towards the driver side 20. In embodiments at least a portion of the second side 36 forms an angle of 190° to 290° with the first side 34 in a configuration in which the first display screen is oriented between the driver side 20 and the passenger side 22.

Further, in embodiments, the first screen 24 includes a length dimension L1 and a width dimension W1. In embodiments, at least one of the length dimension L1 or the width dimension W1 is perpendicular to the center line axis 18 in the bent configuration, and in the planar configuration, at least one of the length dimension L1 or the width dimension W1 that is perpendicular to the center line axis 18 in the bent configuration becomes transverse to the center line axis 18 in the planar configuration. For example, as shown in FIG. 2, the width dimension W1 is substantially perpendicular to the center line axis 18 in the bent configuration, and when the first side 34 is rotated to the planar configuration, the width dimension W1 will become transverse to the center line axis 18.

Additionally, in embodiments, when in the bent configuration, the first side 34 of the glass article 32 has a first portion on the driver side 20 of the center line axis 18 and a second portion on the passenger side 22 of the center line axis 18. When the first side 34 is rotated to the planar configuration, the first portion of the first side 34 of the glass article 32 on the driver side 20 will increase, and the second portion of the first side 34 of the glass article 32 on the passenger side 22 will decrease. That is, the first side 34 will be oriented towards the driver side 20 when in the planar configuration.

FIG. 3 depicts a simplified, schematic side view of the glass article 32 showing the region of the bend axis 40 (as shown in FIG. 2). As can be seen, the glass article 32 includes a glass sheet 42 having a first major surface 44 and a second major surface 46. The second major surface 46 is opposite to the first major surface 44, and a thickness is defined between the first major surface 44 and the second major surface 46. In embodiments, the thickness is, on average, from 0.3 mm to 2.0 mm, in particular from 0.4 mm to 1.1 mm. A minor surface 48 extends around the perimeter of the glass sheet 42 and connects the first major surface 44 and the second major surface 46.

Disposed on the second major surface 46 is at least one hinge, which is depicted as a mandrel hinge 50. In embodiments, the mandrel hinge 50 divides the glass sheet 42 between the first (movable) side 34 and the second (fixed) side 36 and allows for the first side 34 to bend relative to the second side 36 of the glass article 32. In embodiments, the mandrel hinge 50 is positionable such that the first side 34 can be put at any angle between maximum travel positions of the first side 34 (i.e., between the planar configuration oriented toward the driver side and the bent configuration oriented substantially equally between the driver side and the passenger side). Further, in embodiments, the mandrel hinge 50 is manually actuatable, i.e., a user can position the first side 34 of the glass article 32 by hand. In other embodiments, the mandrel hinge 50 is electro-mechanically actuatable such that the first side 34 is positioned by an actuator activated, e.g., by a touch feature, voice command, or push button, by the user. While the hinge is depicted as a mandrel hinge 50 in the figures, the hinge can be any of a variety of hinges suitable to provide a bending axis 40, such as a living hinge, a flexure hinge, a lattice hinge, or a links hinge, among others.

In the embodiment shown in FIG. 3, the mandrel hinge 50 is positioned between a first frame 52 and a second frame 54. The first frame 52 is fixed to the vehicle interior base, e.g., dashboard base 14 (shown in FIG. 1), and the second frame 54 is configured to bend about the mandrel hinge 50. As shown in the schematic of FIG. 3, the first frame 52 is configured to be mounted to the vehicle interior base using first brackets 56. The second frame 54 is depicted as including a second bracket 58, which is representative of an armature of an electro-mechanical or manual actuator.

The first frame 52 has a first frame surface 60 and a second frame surface 62, and the second frame 54 has a third frame surface 64 and a fourth frame surface 66. The first frame surface 60 is opposite to the second frame surface 64 and defines a first thickness $T_1$ of the first frame 52 therebetween. The third frame surface 64 is opposite to the fourth frame surface 66 and defines a second thickness $T_2$ of the second frame 54 therebetween. As will be discussed in greater detail below, the first thickness $T_1$ of the first frame 52 may be different from the second thickness $T_2$ of the second frame 54. Further, the first frame 52 may be made from a different material or have a different structure than the second frame 54.

As can be seen in FIG. 3, the first frame 52 is separated from the second frame 54 by a space S. The mandrel hinge 50 is disposed within the space S. In embodiments, the mandrel hinge 50 is connected to the first frame 52. In embodiments, the first frame 52 and the mandrel hinge 50 form a unitary or single-piece construction of one continuous material. In other embodiments, the mandrel hinge 50 is attached to the first frame 52 using, e.g., fasteners, bonding agents or adhesives, welding, etc. In embodiments, the second frame 54 includes an adaptor 68 configured to engage the mandrel hinge 50 when the glass article 32 is in the bent configuration. In the embodiment depicted, the adaptor 68 includes a structure complementary to an end structure of the mandrel hinge 50 that, when engaged, prevents the second side 36 from over-rotating about the mandrel hinge 50.

FIG. 4 depicts a rear view of the simplified, schematic glass article 32 of FIG. 3. As can be seen in FIG. 4, the first brackets 56 are connected to the second frame surface 62 of the first frame 52, and the second bracket 58 (representative of, e.g., an actuator arm) is connected to the fourth frame surface 66 of the second frame 54. In embodiments, the brackets 56, 58 are permanently attached to the respective frame surfaces 62, 66 of the first and second frames 52, 54 through, e.g., unitary forming, welding, or bonding agents, among other possibilities. In other embodiments, the brackets 56, 58 are reversibly attached to the respective frame surfaces 62, 66 of the first and second frames 52, 54 through, e.g., fasteners or slide- or twist-lock engagements, among other possibilities.

As mentioned above, various designs of the glass article 32 disclosed herein are intended to meet and improve upon headform impact testing (HIT) requirements. During HIT, interior surfaces of a vehicle are investigated to determine whether vehicle interior systems meet relevant head injury criterion (HIC) based on simulated head impact with the vehicle interior system during a crash. In particular, a headform simulating a human head is used to determine the deceleration characteristics of an impact with the tested vehicle interior system. Successful test performance is achieved by reducing both the magnitude of deceleration and the time over which it occurs. As defined in US DOT FMVSS 201, the headform (6.8 kilogram, 165 mm diameter headform) should not exceed 80 g for more than 3 ms when the headform impacts at a speed of 15 mph. Additionally, it is desired that the glass sheet 42 remain intact after HIT so that sharp glass fragments are not produced, which may also contribute to injury.

Figure 5B:
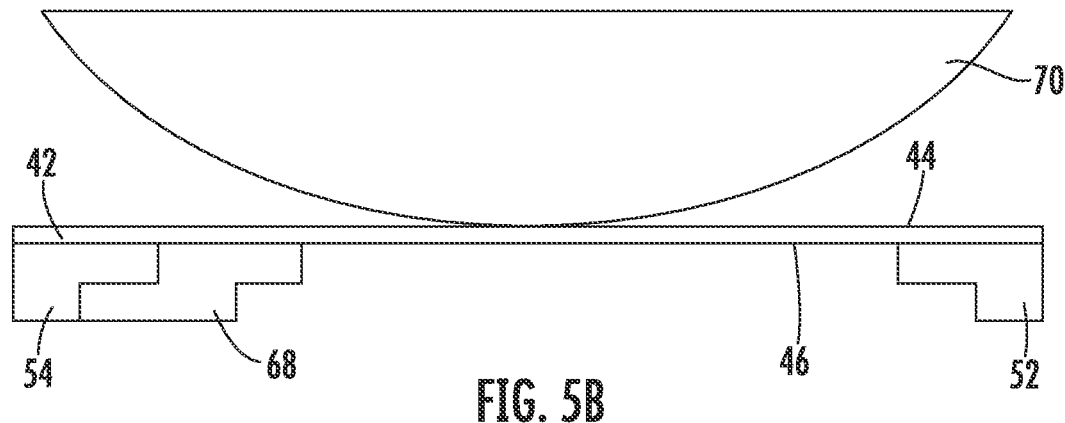

As shown in FIGS. 5A and 5B, HIT was simulated in the region of the mandrel hinge 50 to determine ways to improve HIT performance. The simulations were performed, in particular, in the flat configuration where the glass sheet 42 was not in contact with the mandrel hinge 50 across the entire space S. FIG. 5A depicts a headform 70 at the moment of impact with the first major surface 44 of the glass sheet 42. Impact of the headform 70 was considered at the center of the space S between the first frame 52 and the second frame 54.

In simulating the HIT, various configurations were considered. In particular, different materials and different structures for the mandrel hinge 50 were simulated for HIT performance. In a first simulation, the mandrel hinge was a fully dense aluminum alloy. In a second simulation, the mandrel hinge was an aluminum alloy having a mass one quarter that of the fully dense aluminum alloy (e.g., a mandrel hinge having an expanded, foamed, or honeycomb structure). In a third simulation, the mandrel hinge was made of polyoxymethylene (POM) (e.g., Delrin®, available from DuPont, Wilmington, DE). In a fourth simulation, the performance of the glass article without a mandrel hinge (as shown in FIG. 5B) was considered. In reality, having no mandrel hinge would cause the glass to break, but the no-mandrel condition provides a baseline simulation by which to consider deceleration upon impact with the glass sheet.

Figure 5C:
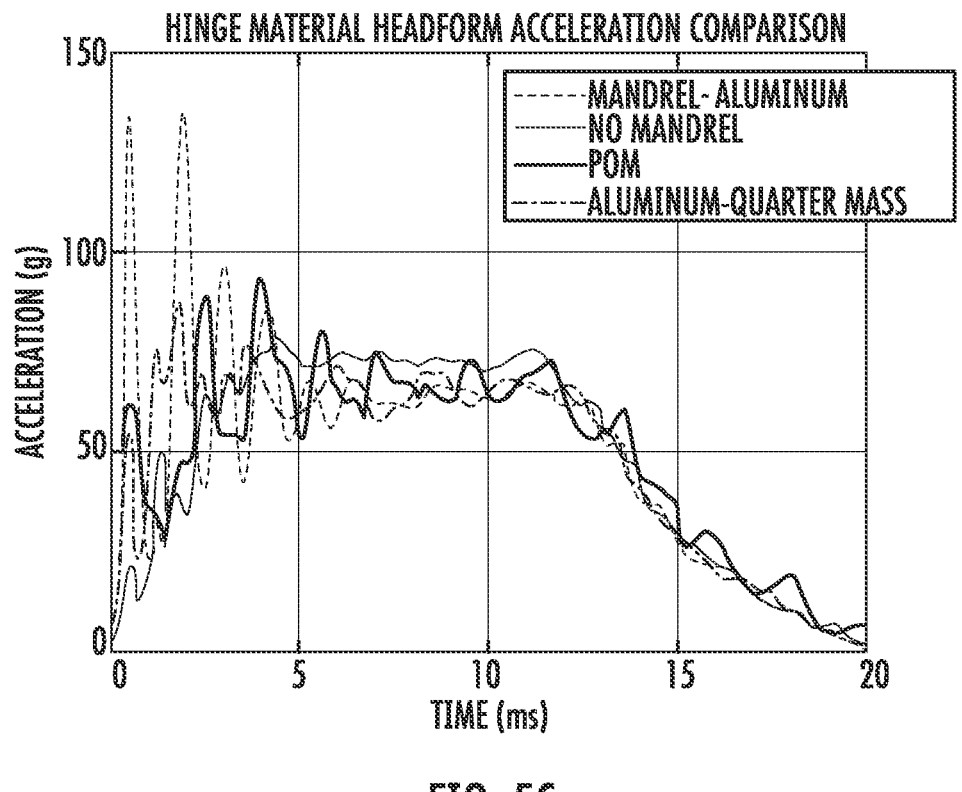

FIG. 5C depicts a graph of data simulated according to the four scenarios. As can be seen, the fully dense aluminum mandrel hinge provided the highest spike in acceleration of over 130 g. The simulation without a mandrel provided a relatively smooth acceleration curve without substantial spikes, although again a glass article without a mandrel would not be desirable in reality because of glass breakage. The simulation of POM and quarter-mass aluminum both performed better than the fully dense aluminum. In particular, both exhibited acceleration spikes much lower in magnitude than the fully dense aluminum with all spikes for the POM and quarter-mass aluminum mandrels being below 100 g.

Figure 5D:
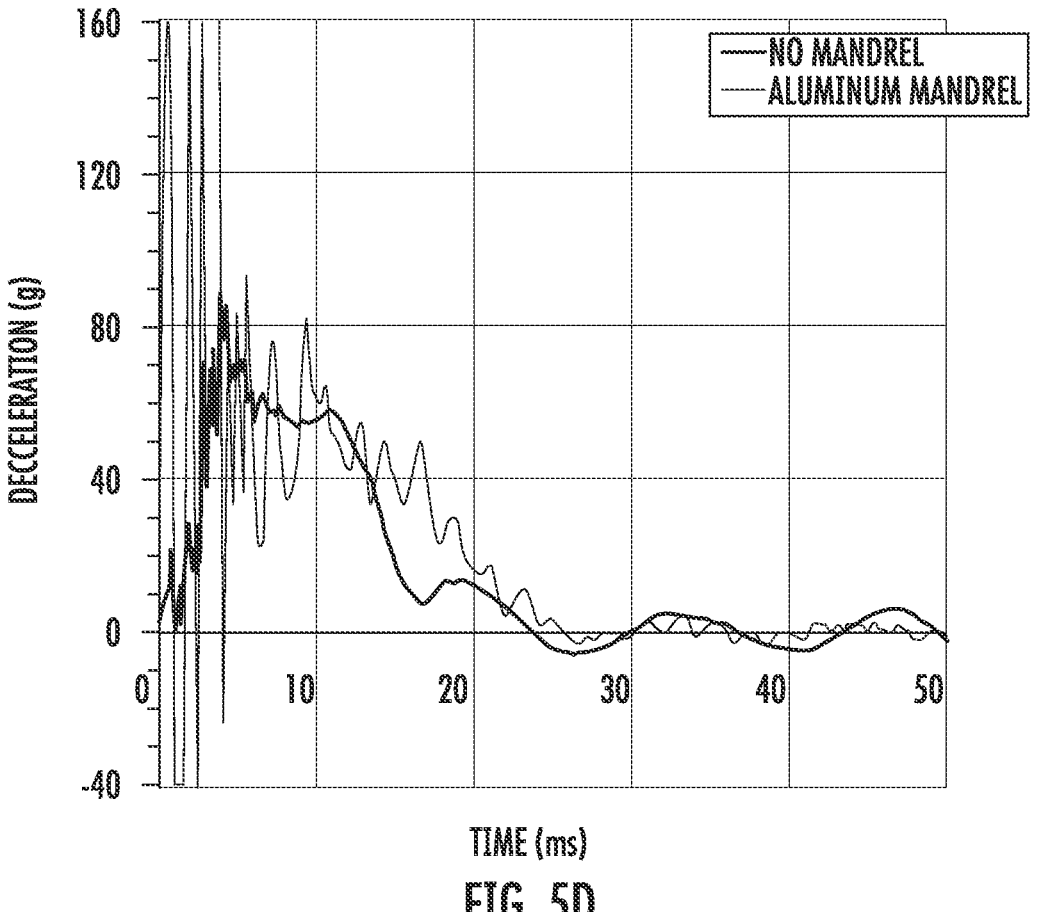

In order to confirm the simulations, the fully dense aluminum mandrel and the no-mandrel conditions were experimentally tested, and the results are shown in FIG. 5D. These experimental tests substantially agree with the results shown in FIG. 5C for the fully dense aluminum mandrel and the no mandrel conditions. Namely, FIG. 5D shows large spikes of the fully dense aluminum mandrel, albeit even higher than the simulated acceleration spikes. Further, FIG. 5D shows no spikes over 100 g for the no mandrel condition as well as a relatively smooth acceleration curve.

Based on the simulated and experimental data, the inventors believe that reducing the mass of the mandrel hinge 50 from that of a fully dense metal (e.g., aluminum, stainless steel, or magnesium) while maintaining the same mandrel hinge 50 size and shape will improve HIT performance. In particular, lowering the mass of the mandrel hinge 50 will bring down initial spikes in acceleration during HIT that are the result of inertial resistance of the mandrel hinge 50. Further, the inventors expect that the lower mass for the mandrel hinge 50 will also improve vibration characteristics, providing for a continuous contact between the headform and glass sheet 42, which distributes impact energy evenly over time. Notwithstanding, the mandrel hinge 50 should be constructed to have sufficient flexural rigidity to avoid glass breakage upon impact by the headform 70. In embodiments, the mandrel hinge 50 is selected to have a flexural rigidity of at least 150 $Pa \cdot m^3$ and a density of at most 2.75 $g/cm^3$.

In one or more embodiments, the flexural rigidity is in a range of about 150 $Pa \cdot m^3$ to about 1000 $Pa \cdot m^3$, about 200 $Pa \cdot m^3$ to about 1000 $Pa \cdot m^3$, about 250 $Pa \cdot m^3$ to about 1000 $Pa \cdot m^3$, about 300 $Pa \cdot m^3$ to about 1000 $Pa \cdot m^3$, about 350 $Pa \cdot m^3$ to about 1000 $Pa \cdot m^3$, about 400 $Pa \cdot m^3$ to about 1000 $Pa \cdot m^3$, about 450 $Pa \cdot m^3$ to about 1000 $Pa \cdot m^3$, about 500 $Pa \cdot m^3$ to about 1000 $Pa \cdot m^3$, about 200 $Pa \cdot m^3$ to about 950 $Pa \cdot m^3$, about 200 $Pa \cdot m^3$ to about 900 $Pa \cdot m^3$, about 200 $Pa \cdot m^3$ to about 850 $Pa \cdot m^3$, about 200 $Pa \cdot m^3$ to about 800 $Pa \cdot m^3$, about 200 $Pa \cdot m^3$ to about 750 $Pa \cdot m^3$, about 200 $Pa \cdot m^3$ to about 700 $Pa \cdot m^3$, about 200 $Pa \cdot m^3$ to about 700 $Pa \cdot m^3$, about 200 $Pa \cdot m^3$ to about 650 $Pa \cdot m^3$, about 200 $Pa \cdot m^3$ to about 600 $Pa \cdot m^3$, about 300 $Pa \cdot m^3$ to about 900 $Pa \cdot m^3$, about 300 $Pa \cdot m^3$ to about 800 $Pa \cdot m^3$, about 300 $Pa \cdot m^3$ to about 700 $Pa \cdot m^3$, or any ranges or subranges therebetween.

In one or more embodiments, the density is in a range of about 1 $g/cm^3$ to about 2.75 $g/cm^3$, about 1 $g/cm^3$ to about 2.7 $g/cm^3$, about 1 $g/cm^3$ to about 2.6 $g/cm^3$, about 1 $g/cm^3$ to about 2.5 $g/cm^3$, about 1 $g/cm^3$ to about 2.4 $g/cm^3$, about 1 $g/cm^3$ to about 2.3 $g/cm^3$, about 1 $g/cm^3$ to about 2.2 $g/cm^3$, about 1 $g/cm^3$ to about 2.1 $g/cm^3$, about 1 $g/cm^3$ to about 2 $g/cm^3$, about 1 $g/cm^3$ to about 1.9 $g/cm^3$, about 1 $g/cm^3$ to about 1.8 $g/cm^3$, about 1 $g/cm^3$ to about 1.7 $g/cm^3$, about 1 $g/cm^3$ to about 1.6 $g/cm^3$, about 1 $g/cm^3$ to about 1.5 $g/cm^3$, about 1.1 $g/cm^3$ to about 2.7 $g/cm^3$, about 1.2 $g/cm^3$ to about 2.7 $g/cm^3$, about 1.3 $g/cm^3$ to about 2.7 $g/cm^3$, about 1.4 $g/cm^3$ to about 2.7 $g/cm^3$, about 1.5 $g/cm^3$ to about 2.7 $g/cm^3$, about 1.6 $g/cm^3$ to about 2.7 $g/cm^3$, about 1.7 $g/cm^3$ to about 2.7 $g/cm^3$, about 1.8 $g/cm^3$ to about 2.7 $g/cm^3$, about 1.9 $g/cm^3$ to about 2.7 $g/cm^3$, about 2 $g/cm^3$ to about 2.7 $g/cm^3$, about 1.2 $g/cm^3$ to about 2.5 $g/cm^3$, about 1.3 g/cm³ to about 2.2 g/cm³, about 1.4 g/cm³ to about 2 g/cm³, or any ranges or subranges therebetween.

In order to provide the desired flexural rigidity (within the geometric constraints of the glass article 32) and density, engineering plastics or composites can be used. Examples of such materials include polyoxymethylene (POM), polyether ether ketone (PEEK), polyetherimide (PEI), polyamides, polyethylene terephthalate (PET), polycarbonate (PC), acrylic polymers, carbon fiber composites, glass fiber composites, and polytetrafluoroethylene, among other thermoplastic and composite materials. Further, in embodiments, metals can be used, in particular aluminum, stainless steel, and magnesium alloys in expanded, foamed, or honeycomb structures. In still other embodiments, laminate materials can be used that include layers of plastic and metal.

According to another aspect, the HIT performance can be improved by decreasing the stress on the glass sheet 42 upon impact of the headform 70. According to an embodiment, stress on the glass sheet 42 can be decreased during HIT by providing one or more backing plates 72 defining a localized thin region behind the glass sheet 42. FIG. 6A depicts an embodiment having one backing plate 72 joined to the second major surface 46 of the glass sheet 42 with an adhesive layer 74. As can be seen in FIG. 6A, the backing plate 72 has two different thicknesses. In particular, a middle region 76 of the backing plate 72 has a first plate thickness $P_1$, and outer regions 78 of the backing plate 72 have a second thickness $P_2$. The first thickness $P_1$ of the middle region 76 is less than the second thickness $P_2$ of the outer regions 78. In embodiments, the second thickness $P_2$ is 1.1 to 2 times as thick the first thickness $P_1$ (i.e., 1.1 $P_1 \leq P_2 \leq 2P_1$). In embodiments, the first thickness $P_1$ is from 0.05 mm to 5 mm. In one or more embodiments, the width of the middle region 76 is from 25% to 95% of the width of the backing plate 75.

FIG. 6B depicts another embodiment in which three backing plates 72a, 72b, 72c are used to provide a region of localized thinness. In particular, the glass article 32 includes a first backing plate 72a disposed on the second major surface 46. A second backing plate 72b is provided in one outer region 78, and a third backing plate 72c is provided in the other outer region 78. In embodiments, the second and third backing plates 72b, 72c are connected to the first backing plate 72a. In such embodiments, the backing plates 72b, 72c may be connected to the first backing plate 72a using mechanical constraints (e.g., spot welding, riveting, fasteners, etc.) or adhesives. In other embodiments, the second and third backing plates 72b and 72c are not connected to the first backing plate 72a.

A space is provided between the second backing plate 72b and the third backing plate 72c to define the middle region 76 of localized thinness. In embodiments, space between the second backing plate 72b and the third backing plate 72c is from 25% to 95% of the width of the first backing plate 72a. As with the embodiment of FIG. 6A, the embodiment of FIG. 6B with three backing plates 72a-c may define a second thickness $P_2$ that is 1.1 to 2 times the first thickness $P_1$.

In embodiments, the backing plate 72 or backing plates 72a-c are comprised of a metal material, such as an aluminum alloy, a magnesium alloy, or a steel alloy (such as stainless steel alloy). In the embodiments of the glass articles 32 including a backing plate 72 or backing plates 72a-c, the backing plate or plates may be joined to the frames 52, 54 by spot welding, riveting, or fasteners, among other possibilities.

FIG. 6C depicts the stress on the first major surface 44 of the glass sheet 42 when the glass article is in the bent configuration as shown in FIG. 6C. In the simulations performed to generate the data shown in FIG. 6C, three conditions were considered. In a first condition, a single stainless steel backing plate having one thickness of 0.254 mm was considered. In a second condition, a single stainless steel backing plate having one thickness of 0.508 mm was considered. In a third condition, a hybrid, variable thickness backing plate 72 or 72a-c as shown in FIG. 6A or 6B was considered. As can be seen in FIG. 6C, the first condition having the thin backing plate of constant thickness produced the highest maximum principal stress, which was over 900 MPa. FIG. 6D shows the location of the maximum principal stress on the first major surface 44. The location of the maximum principal stress on the first major surface 44 was the same for each condition, but the magnitude of the maximum principal stress was different. In the second condition having the thick backing plate of constant thickness produced the lowest maximum principal stress on the first major surface 44 of just over 600 MPa. Despite producing the lowest maximum principal stress, the thickness of the backing plate across the bending region undesirably increases the bending force required to move the glass article between the flat and bent configurations.

As shown in FIG. 6C, the hybrid backing plate having the region of localized thinness produced a maximum principal stress of just over 700 MPa. Further, because the backing plate 72 or backing plates 72a-c include the region of localized thinness, the bending force to move the glass article between the flat and bent configurations is not increased. Thus, the region of localized thinness defined by the backing plate 72 or backing plates 72a-72c results in decreased maximum principal stress on the first major surface 44 as compared to a uniformly thin backing plate and does not increase bending force as compared to a uniformly thick backing plate.

According to another embodiment, the maximum principal stress on the first major surface 44 can be decreased by decreasing the mass of the movable second frame 54 relative to the fixed first frame 54. The mass of the second frame 54 can be decreased in a variety of ways. For example, as discussed above with respect to the mandrel hinge 50, the mass of the second frame 54 can be decreased by replacing a solid, fully dense material with a different material or an expanded, foamed, or honeycombed version of the material. Thus, for example, the second frame 54 may be made of polyoxymethylene (POM), polyether ether ketone (PEEK), polyetherimide (PEI), polyamides, polyethylene terephthalate (PET), polycarbonate (PC), acrylic polymers, carbon fiber composites, glass fiber composites, and polytetrafluoroethylene, among other thermoplastic and composite materials, or the second frame may be made of aluminum, stainless steel, or magnesium alloy in expanded, foamed, or honeycomb structures. Still further, the second frame 54 may be made of laminate materials that include layers of plastic and metal. In other embodiments, the second frame 54 is made of the same material as the first frame 52 but made to be thinner than the first frame 52.

Figure 7A:
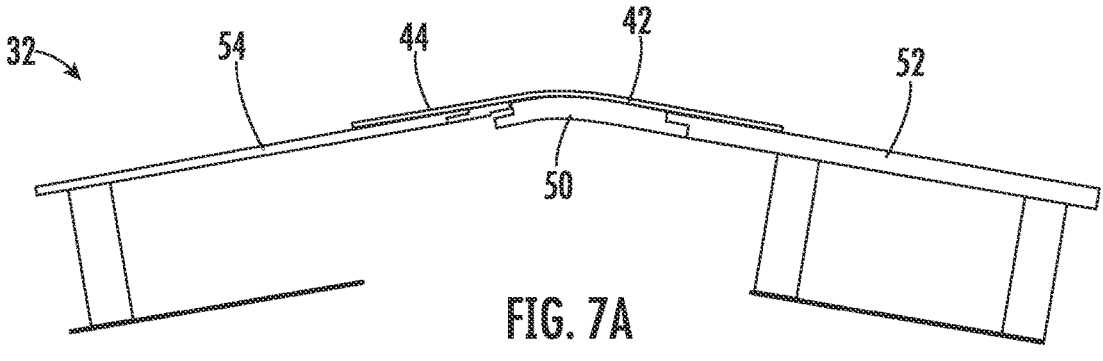
FIGS. 7A-7C depict glass articles having a free side with less mass than the fixed side and data regarding maximum principle stress associated therewith, according to exemplary embodiments.
Figure 7B:
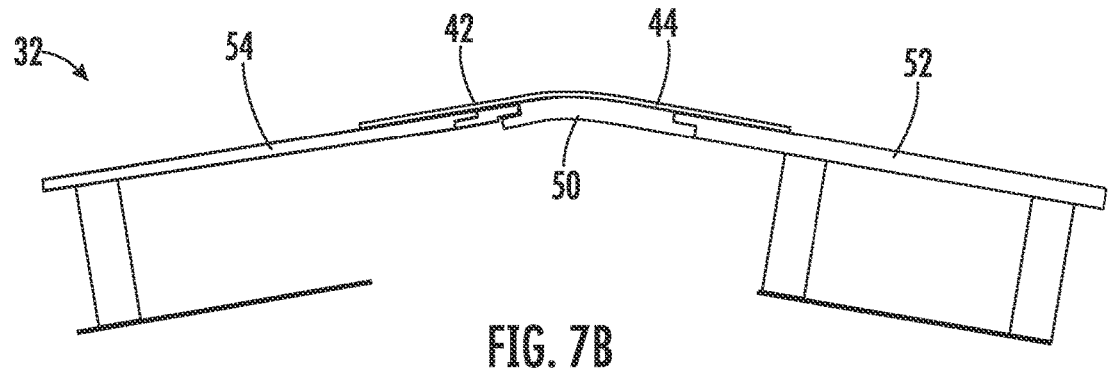
Figure 7C:
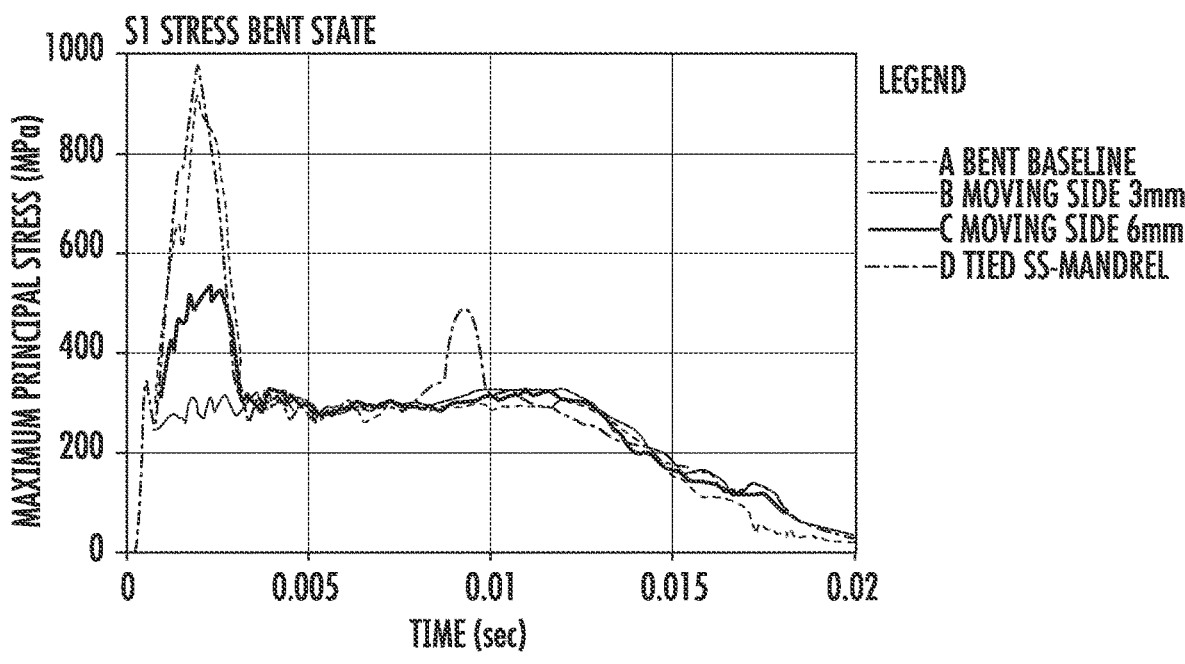

FIGS. 7A and 7B depict examples in which the second frame 54 is thinner than the first frame 52. In FIG. 7A, the second frame 54 is 3 mm thick, and the first frame 52 is 10 mm thick. In FIG. 7B, the second frame 54 is 6 mm thick, and the first frame 52 is 10 mm thick. FIG. 7C depicts the maximum principal stress on the first major surface 44 of the glass sheet 42 during HIT for the two conditions shown in FIGS. 7A and 7B as well as the conditions in which (1) the first frame and the second frame have the same thickness and in which (2) the first frame and the second frame have the same thickness with the mandrel adaptor (68 in FIG. 3) being tied (e.g., welded) to the second frame.

As can be seen in FIG. 7C, the condition in which the first frame and the second frame have the same thickness produces a maximum principal stress of over 900 MPa. Further, the condition in which the mandrel adaptor is tied to the frame produces a maximum principal stress of almost 1000 MPa. FIG. 7C demonstrates that the maximum principal stress is less than 550 MPa for the condition shown in FIG. 7B and less than 350 MPa for the condition shown in FIG. 7A. Thus, by reducing the mass of the moving side (i.e., reducing inertial resistance), the maximum principal stress on the first major surface 44 is reduced.

According to another embodiment, the maximum principal stress on the first major surface 44 can be reduced by stiffening the mandrel hinge 50 by fixing it to the first frame 52. In particular, it was determined that rigidly fixing the mandrel hinge 50 to the first frame 52 or forming the mandrel hinge 50 and first frame 52 as a single, unitary part increased the stiffness of the mandrel hinge 50 in such a manner that the maximum principal stress generated on the first major surface 44 of the glass sheet 42 was not sufficient to break the glass sheet 42.

According to another aspect, the acceleration spikes and maximum principal stress on the glass during HIT can both be reduced through configuration of the second bracket 58 stiffness and location. Returning to FIG. 4, the second bracket 58 can theoretically be mounted anywhere on the fourth frame surface 66. However, the inventors have determined that mounting the second bracket 58 closer to the free end of the second frame 54 decreases acceleration spikes and decreases maximum principal stress on the second major surface 46 of the glass sheet 42.

Figure 8A:
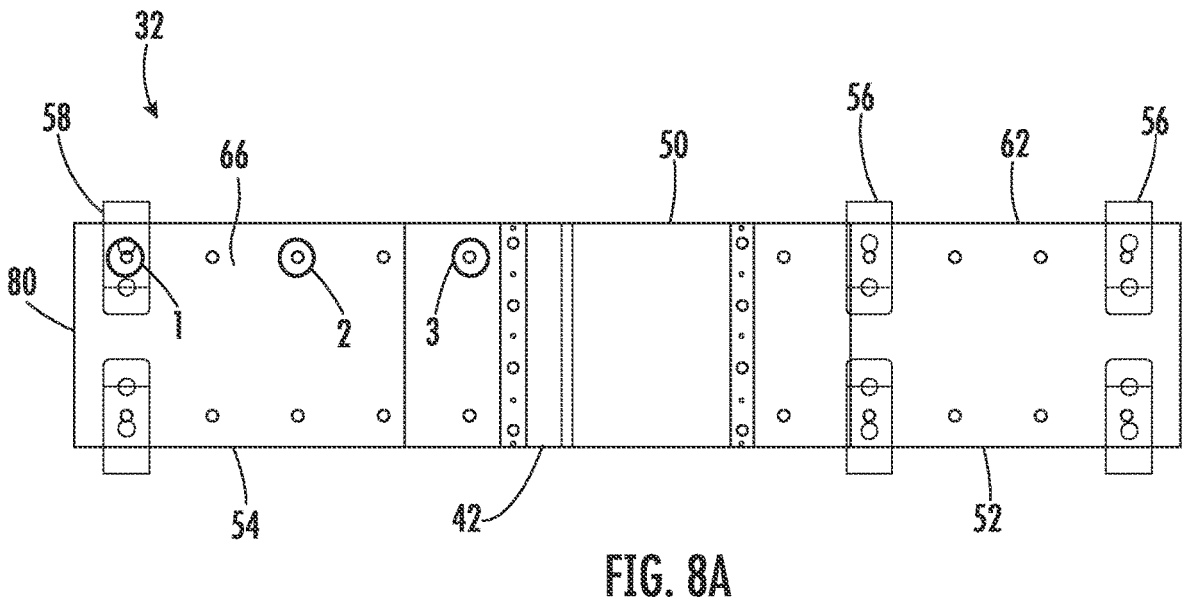
FIGS. 8A-8C various positions for mounting a bracket on the free side of a glass article and data regarding maximum principal stress on the glass during headform impact testing as a result of bracket placement, according to exemplary embodiments.
Figure 8B:
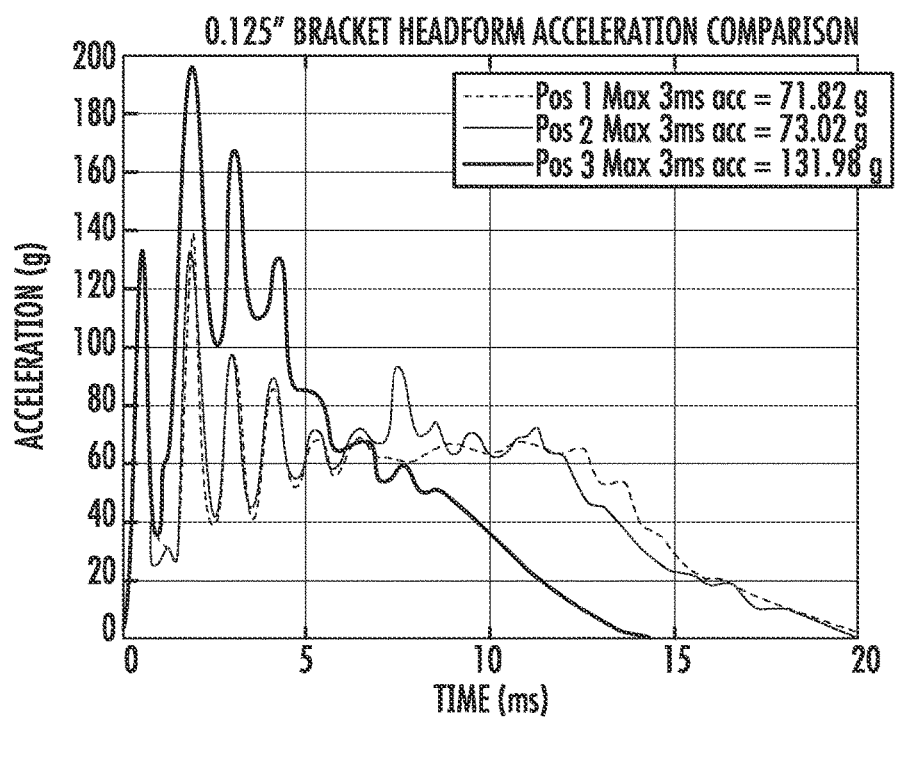
Figure 8C:
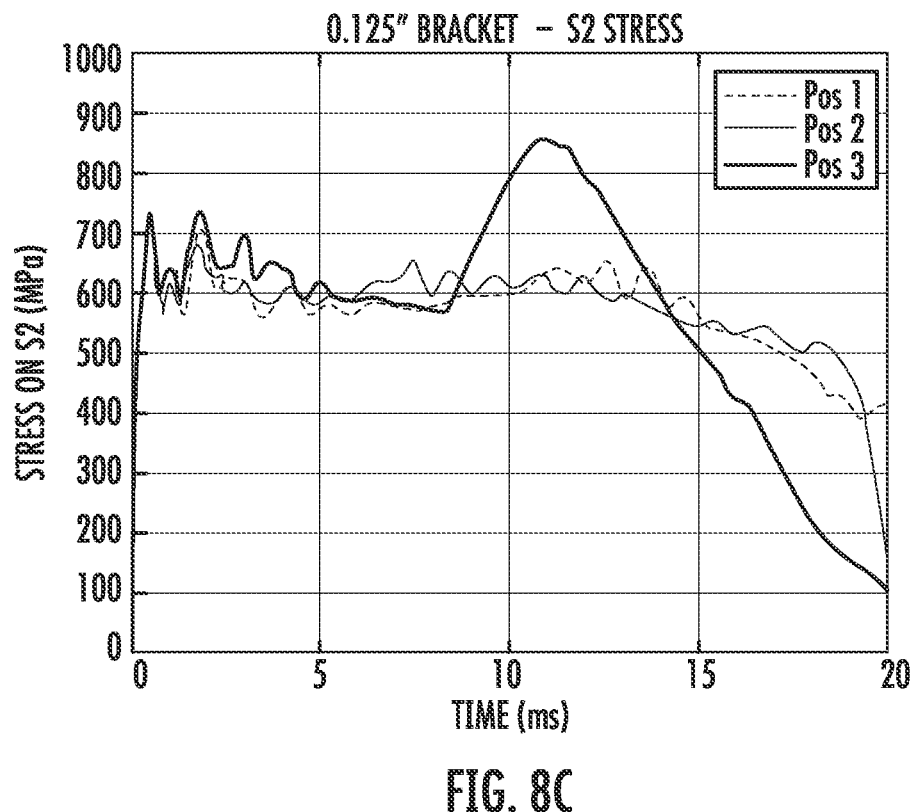
Figure 9A:
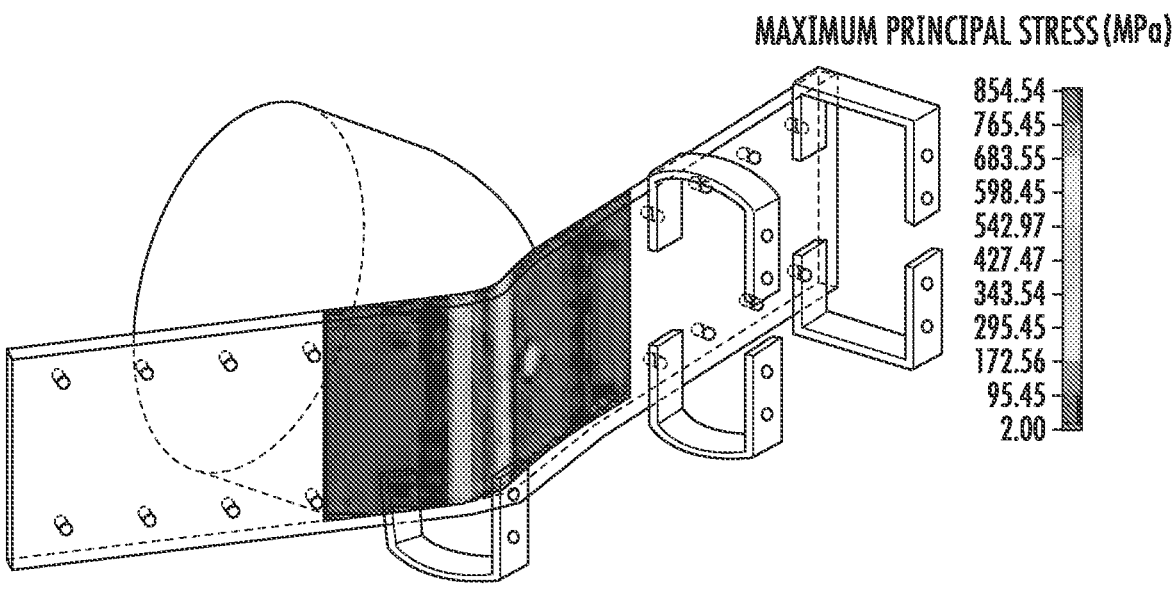
FIGS. 9A and 9B depict glass articles in which the bracket is mounted too close to the mandrel and the overbending associated therewith.
Figure 9B:
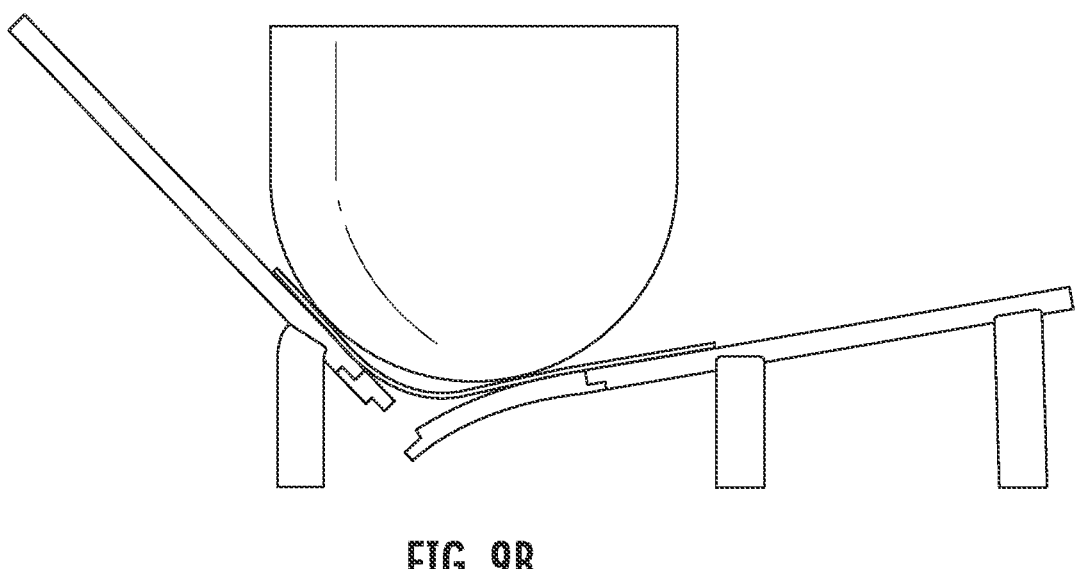

With reference now to FIG. 8A, the back of the glass article 32 is depicted. On the fourth frame surface 66 of the second frame 54, three locations are identified for mounting the second bracket 58. The first position is farthest from the mandrel hinge 50 and closest to a free end 80. The second position is between the free end 80 and the mandrel hinge 50, and the third position is closest to the mandrel hinge 50 and farthest from the free end 80. Based on the position of the second bracket 58, the acceleration curve and maximum principal stress were determined for HIT. FIGS. 8B and 8C depict the acceleration curve and principal stress curve, respectively. As can be seen in FIG. 8B, the third position closest to the mandrel hinge 50 produced the highest acceleration spikes. Further, as shown in FIG. 8C, the third position also produced the highest maximum principal stress on the second major surface 46 of the glass sheet 42. The inventors believe that the higher maximum principal stress is the result of over-bending of the glass in the hinge area as shown in FIGS. 9A and 9B. FIGS. 8B and 8C demonstrate that the acceleration peaks and the maximum principal stress are lower for both the first and second positions.

Figure 10A:
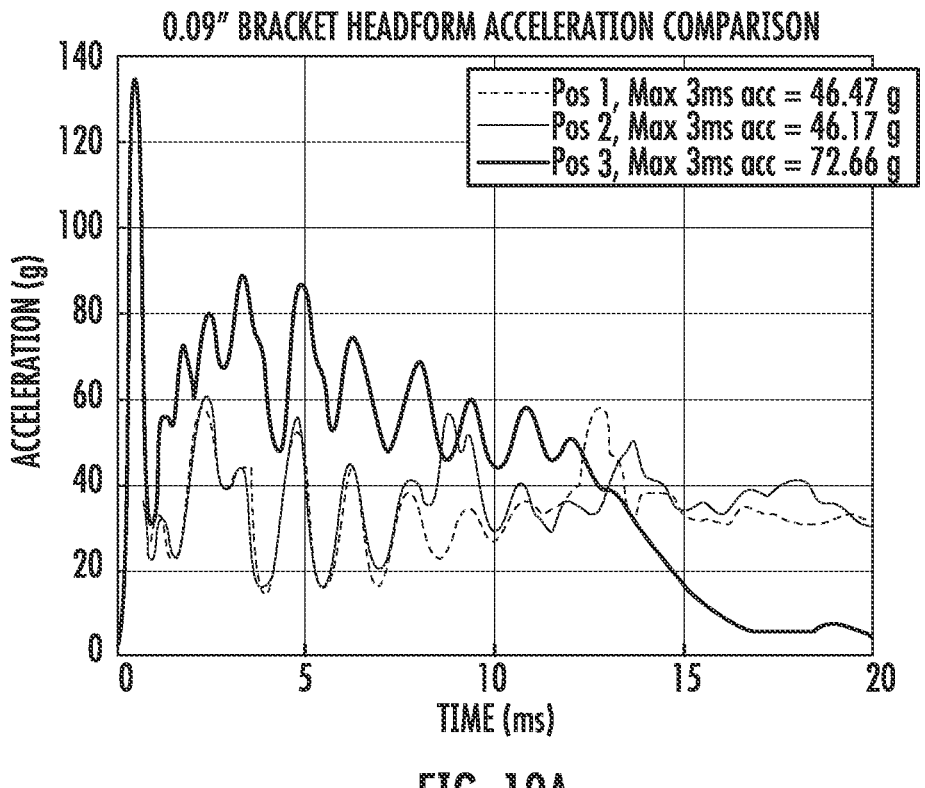
FIGS. 10A and 10B depict the maximum principal stress on a glass sheet during headform impact testing based on bracket position and bracket stiffness, according to exemplary embodiments.
Figure 10B:
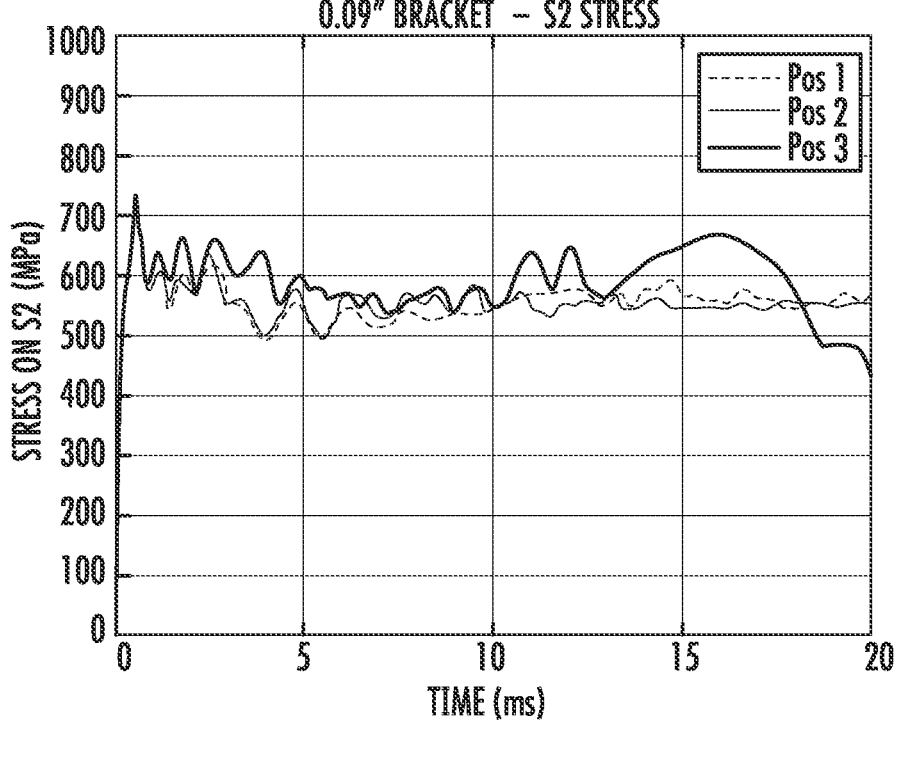

The simulations performed to generate the data for FIGS. 8B and 8C considered a second bracket 58 having a thickness of 0.125". In order to determine the effect of stiffness on the peak acceleration and the maximum principal stress, the simulations were repeated for a second bracket having a thickness of 0.09". FIGS. 10A and 10B depict the results of those simulations. As can be seen, the third position still exhibits the highest acceleration peaks and the highest maximum principal stress, whereas the first and second positions exhibit roughly the same peak acceleration and maximum principal stress. However, decreasing the thickness of the second bracket 58, which lowers the stiffness, also lowers the overall magnitude of the peak acceleration and the maximum principal stress. For example, the 3 ms acceleration for the first and second positions was 71.82 g and 73.02 g, respectively, for the thicker second bracket 58, but for the thinner second bracket 58, the 3 ms acceleration for the first and second positions was 46.47 g and 46.17 g, respectively. Similarly, for the first and third positions, the thicker second bracket 58 resulted in a maximum principal stress curve that was predominantly over 600 MPa, whereas the thinner second bracket 58 resulted in a maximum principal stress curve that was predominantly under 600 MPa.

Based on the simulations related to the positioning and stiffness of the second bracket 58, the inventors believe that the reduction in peak acceleration and in maximum principal stress relates to energy absorption through plastic deformation of the second bracket 58. Thus, in embodiments, the peak acceleration and maximum principal stress can be reduced by mounting the second bracket 58 on the fourth frame surface 66 from a position at the midpoint between the mandrel hinge 50 and the free end 80 to a position adjacent the free end 80.

Figure 11A:
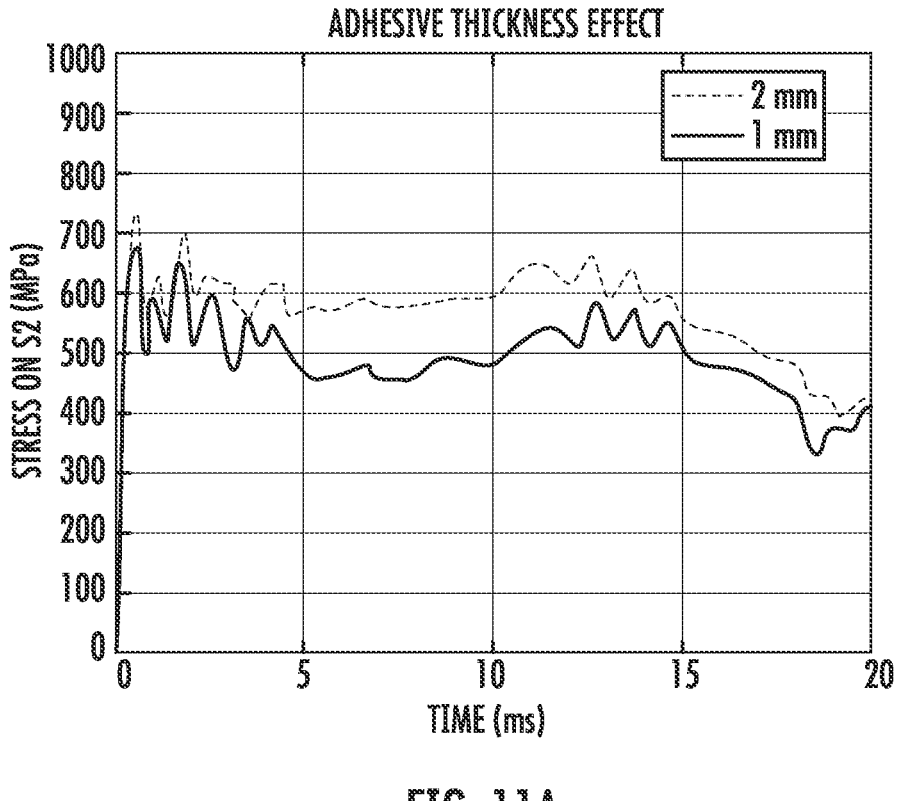
FIGS. 11A-11C depict the effect of adhesive thickness between a glass sheet and frame of the glass article on maximum principle stress and peak acceleration during headform impact testing in the planar configuration, according to exemplary embodiments.
Figure 11B:
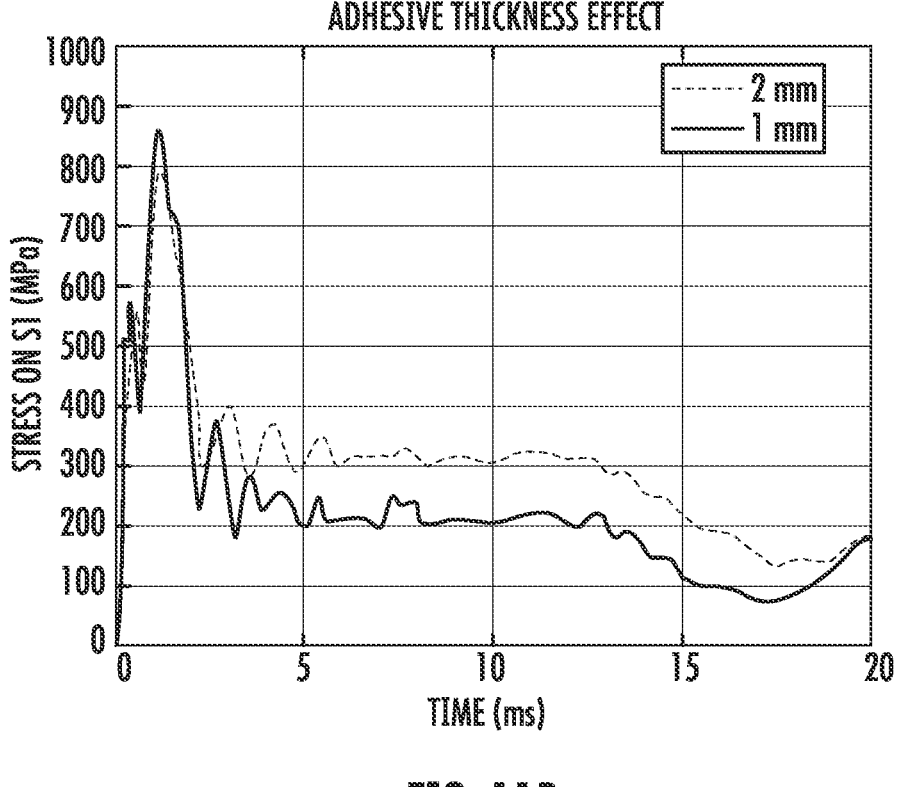
Figure 11C:
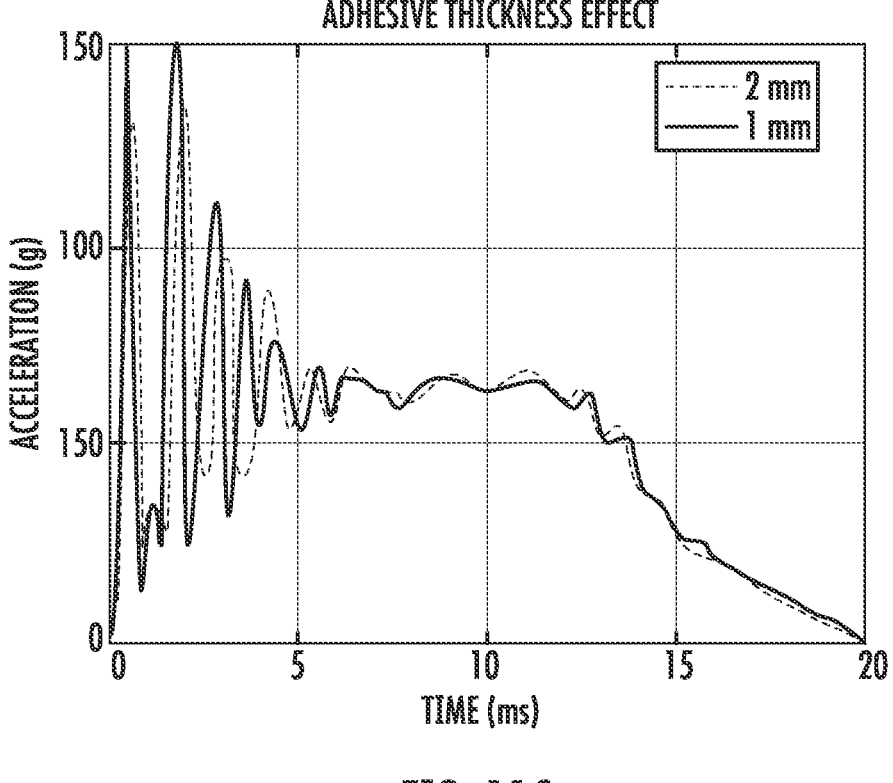
Figure 12A:
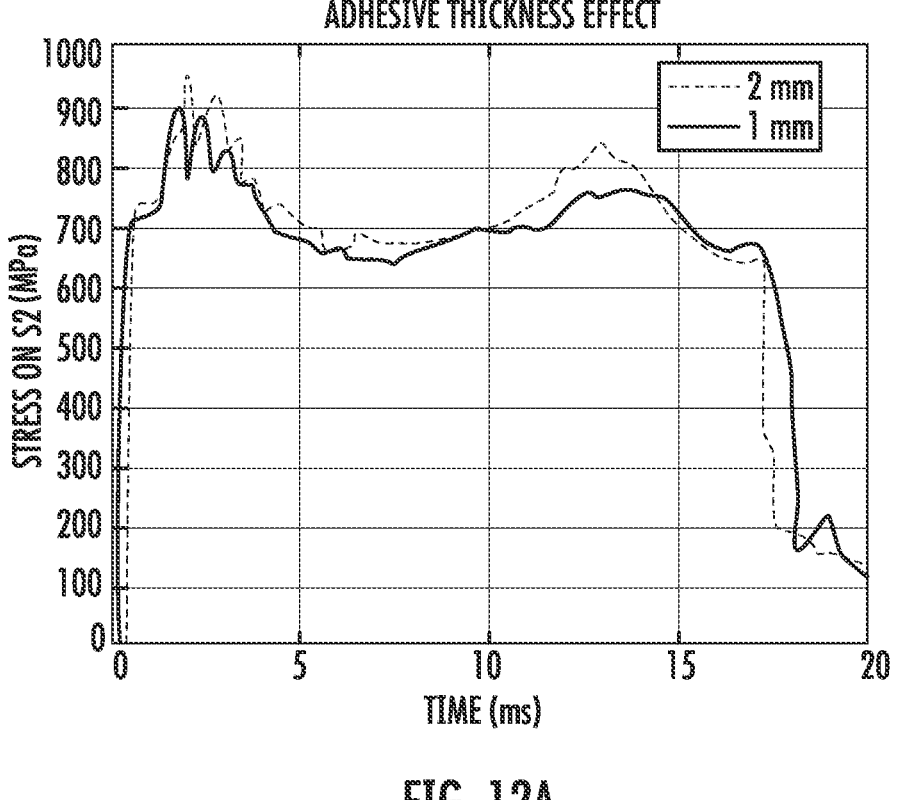
FIGS. 12A-12C depict the effect of adhesive thickness between a glass sheet and frame of the glass article on maximum principle stress and peak acceleration during headform impact testing in the bent configuration, according to exemplary embodiments.
Figure 12B:
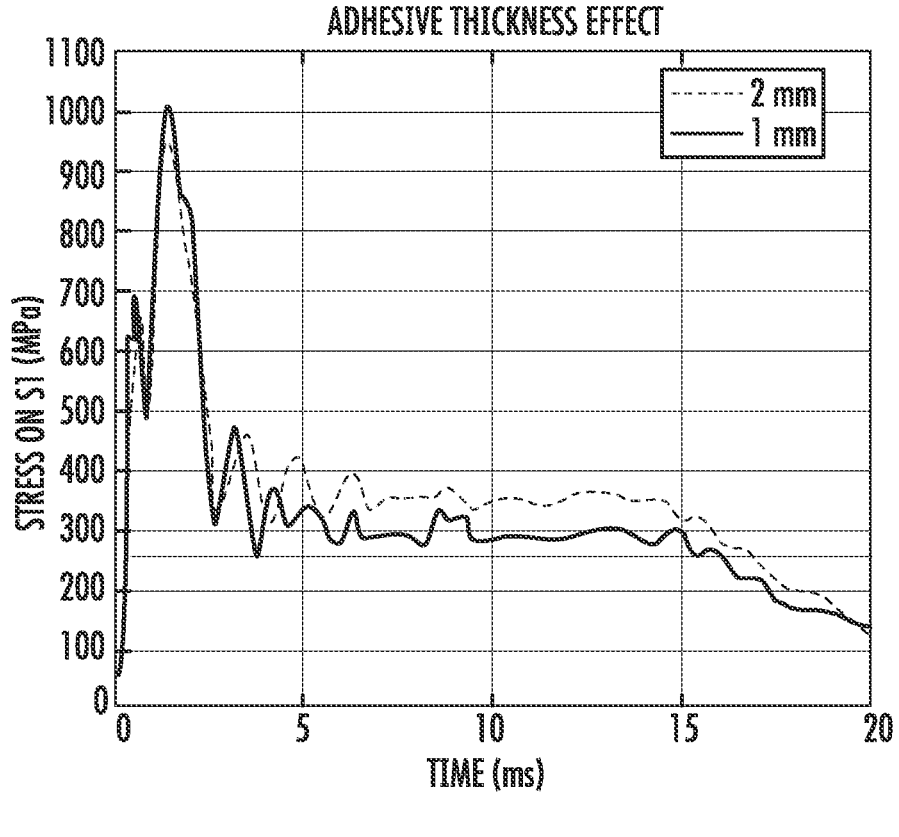
Figure 12C:
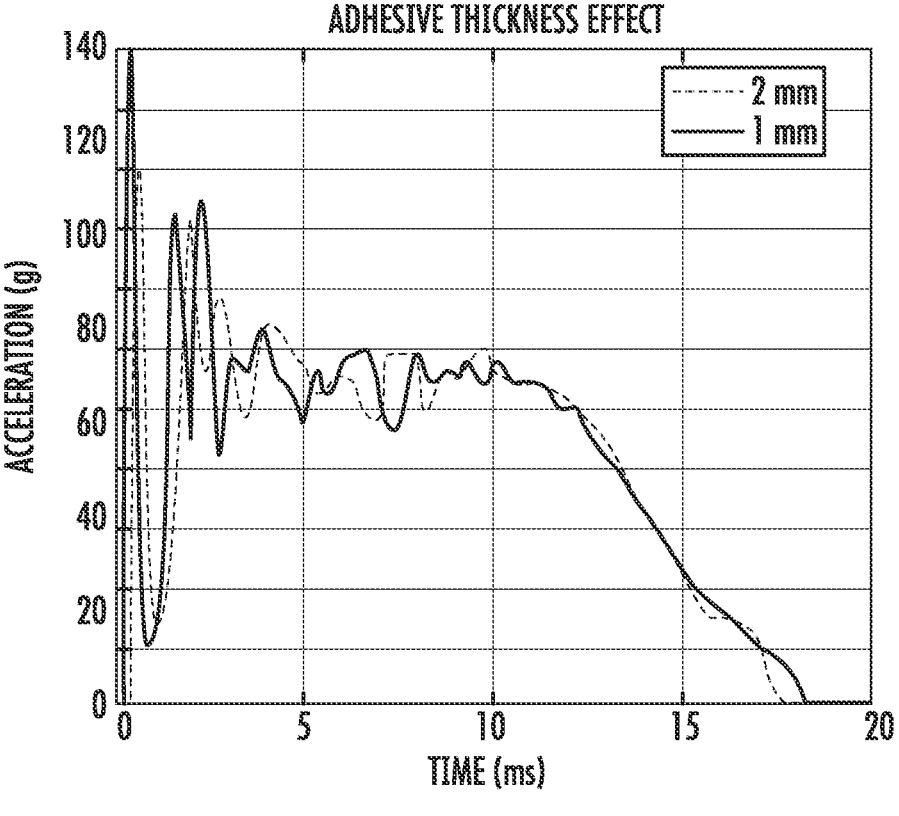

According to another aspect, the maximum principal stress on the second major surface 46 of the glass sheet 42 can be decreased without causing an increase in peak acceleration or a substantial increase in maximum principal stress on the first major surface 44 by decreasing a thickness of the adhesive layer joining the glass sheet 42 to the first and second frames 52, 54. In particular, FIGS. 11A and 12A depict a graph of the maximum principal stress on the second major surface 46 of the glass sheet 42 in the flat configuration and bent configuration, respectively. As can be seen, the maximum principal stress is lower on the second major surface 46 when the adhesive is at 1 mm as opposed to 2 mm for both the flat and bent configurations. FIGS. 11B and 12B depict a graph of the maximum principal stress on the first major surface 44 of the glass sheet 42 in the flat and bent configurations, respectively. For the thinner adhesive layer, the maximum principal stress is only slightly increased, which can be managed through one of the techniques described above. Further, FIGS. 11C and 12C demonstrate a graph of the peak acceleration in the flat configuration and bent configuration, respectively. As can be seen, the reduction in adhesive thickness does not substantially change the peak acceleration experienced during HIT. Thus, in embodiments, the thickness of the adhesive layer between the glass sheet 42 and the frames 52, 54 is from 0.5 mm to 1.5 mm, in particular about 1 mm.

While each of these concepts for reducing the peak acceleration or maximum principal stress during HIT was described individually, it should be noted that the various techniques can be combined to provide a larger overall reduction in peak acceleration or maximum principal stress during HIT.

Having described various embodiments of the glass article 32, methods of forming the glass article 32 are now described. In embodiments, the curvatures 38*a-c* of the glass article 32, particularly on the second side 36, can be produced by either hot-forming or cold-forming. By "cold-forming," it is meant that the curvatures 38 are introduced to the glass sheet 42 at a temperature below the softening temperature of the glass. More particularly, cold-forming takes place at below 200° C., below 100° C., or even at room temperature. "Hot-forming" by contrast, takes place at temperatures at or above the softening temperature of the glass sheet 42, using presses, sagging apparatuses, forming lehrs, etc. A further distinguishing feature between hot-forming and cold-forming is that the curvatures 38 introduced by hot-forming are permanent in that the glass sheet 42 will retain the curvatures until re-formed at a temperature at or above the softening temperature.

Curvatures introduced by cold-forming are not permanent. In particular, during cold forming, pressure is applied to the glass sheet 42 to bring the glass sheet 42 into conformity with a desired shape. Pressure may be applied in a variety of different ways, such as vacuum pressure, a mechanical press, rollers, etc. The glass sheet 42 is then bonded to a support structure (e.g., frames 52, 54) to retain the glass sheet 42 in its cold-formed shape. However, if debonded from the support structure, the glass sheet 42 will spring back to its planar configuration. This property is exploited for the fourth curvature 38d shown in FIG. 2, and by using the mandrel hinge 50, the glass sheet 42 is allowed to bend between the planar configuration (oriented towards the driver side 20) and the bent configuration (oriented between the driver side 20 and the passenger side 22). However, the other curvatures 38a-c, being on the fixed, second side 36, would be retained in their cold-formed position.

In the following paragraphs and with reference to FIGS. 1-2, various geometrical properties of the glass sheet 42 as well as compositions of the glass sheet are provided. As mentioned above, the glass sheet 42 has a thickness that is substantially constant and is defined as a distance between the first major surface 44 and the second major surface 46. In various embodiments, the thickness is from 0.3 mm to 2.0 mm. In addition, the glass sheet 42 includes a width W2 defined as a first maximum dimension of one of the first or second major surfaces 44, 46 orthogonal to the thickness, and a length L2 defined as a second maximum dimension of one of the first or second major surfaces 44, 46 orthogonal to both the thickness and the width. In other embodiments, width W2 and length L2 may be the average width and the average length of the glass sheet 42, respectively, and in other embodiments, width W2 and length L2 may be the maximum width and the maximum length of the glass sheet 42, respectively (e.g., for glass sheets 42 having a variable width or length). In various embodiments, width W2 is in a range from 5 cm to 250 cm, and length L2 is in a range from about 5 cm to about 1500 cm. Further, in various embodiments, the curvatures 38a-d of the glass article 32 may have each have a radius of curvature in a range from about 20 mm to about 10,000 mm.

Further, the various embodiments of the vehicle interior system may be incorporated into vehicles such as trains, automobiles (e.g., cars, trucks, buses and the like), sea craft (boats, ships, submarines, and the like), aircraft (e.g., drones, airplanes, jets, helicopters and the like), and spacecraft.

In embodiments, the glass sheet 42 may be strengthened. In one or more embodiments, glass sheet 42 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 42 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 42 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T of the glass sheet 42 (as described herein). For example, in one or more embodiments, the DOC may be equal to or greater than about 0.05 T to about 0.25 T. In some instances, the DOC may be about 20 μm to about 300 μm. Further, in one or more embodiments, the strengthened glass sheet may have a CS (which may be found at the surface or a depth within the glass sheet) of about 200 MPa or greater, about 500 MPa or greater, or about 1000 MPa or greater. In one or more embodiments, the strengthened glass sheet may have a maximum tensile stress or central tension (CT) of about 20 MPa or greater, about 50 MPa or greater, or about 85 MPa or greater.

Suitable glass compositions for use in glass sheet 42 include soda lime glass, aluminosilicate glass, borosilicate glass, boroaluminosilicate glass, alkali-containing aluminosilicate glass, alkali-containing borosilicate glass, and alkali-containing boroaluminosilicate glass.

In one or more embodiments, the glass composition may include $SiO_2$ in an amount in a range from about 66 mol % to about 80 mol %, $Al_2O_3$ in an amount in a range from about 4 mol % to about 15 mol %, $B_2O_3$ in an amount in a range from about 0 mol % to about 5 mol %, $P_2O_5$ in an amount in a range from about 0 mol % to about 2 mol %, $R_2O$ in an amount in a range from about 8 mol % to about 20 mol %, RO in an amount in a range of from about 0 mol % to about 2 mol %, $ZrO_2$ in an amount in a range of from about 0 mol % to about 0.2 mol %, and $SnO_2$ in an amount in a range from about 0 mol % to about 0.2 mol %. In the foregoing composition, $R_2O$ refers to the total amount of alkali metal oxides, such as $Li_2O$, $Na_2O$, $K_2O$, $Rb_2O$, and $Cs_2O$). In particular, $Na_2O$ may be present in an amount in a range from about from about 8 mol % to about 20 mol %, and $K_2O$ may be present in an amount in a range from about 0 mol % to about 4 mol %. Further, in the foregoing composition, RO refers to the total amount of alkaline earth metal oxide such, as CaO, MgO, BaO, ZnO and SrO. In particular, CaO may be present in an amount in a range of from about 0 mol % to about 1 mol %, and MgO may be present in an amount in a range of from about 0 mol % to about 7 mol %.

In embodiments, the glass composition may include other oxides of such metals as Ti, V, Cr, Mn, Fe, Co, Ni, Cu, Ce, W, and Mo. In particular, Fe in the form of $Fe_2O_3$ may be present in an amount in a range of from about 0 mol % to about 1 mol %, and $TiO_2$ may be present in an amount of in a range of about 0 mol % to about 5 mol %.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Aspect (1) pertains to a glass article for a vehicle interior system, comprising: a glass sheet having a first major surface and a second major surface opposite to the first major surface, wherein the glass sheet comprises a first side and a second side; a first frame disposed on the second major surface of the glass sheet on the first side of the glass sheet; a second frame disposed on the second major surface of the glass sheet on the second side of the glass sheet; a mandrel disposed between the first frame and the second frame and on the second major surface of the glass sheet, the mandrel comprising a flexural rigidity of at least 150 Pa·m³ and a density of at most 2.75 g/cm³; wherein the second side of the glass sheet rotates about the mandrel from a first configuration to a second configuration; and wherein, in the first configuration, the first side forms a first angle with the second side and, in the second configuration, the first side forms a second angle with the second side, the first angle being different from the second angle.

Aspect (2) pertains to the glass article of Aspect (1), wherein the flexural rigidity is up to 1000 Pa·m³ and wherein the density is at least 1 g/cm³.

Aspect (3) pertains to the glass article of Aspect (1) or Aspect (2), wherein the mandrel comprises polyoxymethylene, polyether ether ketone, polyetherimide, polyamides, polyethylene terephthalate, polycarbonate, acrylic polymers, carbon fiber composites, glass fiber composites, and polytetrafluoroethylene.

Aspect (4) pertains to the glass article of Aspect (1) or Aspect (2), wherein the mandrel comprises a metal having a foamed, expanded, or honeycomb structure.

Aspect (5) pertains to the glass article of any one of Aspects (1) through (4), wherein the first side and the mandrel comprise a unitary construction.

Aspect (6) pertains to the glass article of any one of Aspects (1) through (5), further comprising an actuator arm connected to the second frame, the second frame comprising a proximal end adjacent to the mandrel and a distal end located a position furthest from the mandrel, wherein the actuator arm is configured to rotate the glass sheet between the first configuration and the second configuration.

Aspect (7) pertains to the glass article of Aspect (6), wherein the second frame comprises a midpoint between the proximal end and the distal end and wherein the actuator arm is connected to the second frame at a position from the midpoint to the distal end.

Aspect (8) pertains to the glass article of any one of Aspects (1) through (7), further comprising a metal backing plate disposed between the glass sheet and the first and second frames, wherein the metal backing plate comprises a section of thinning located between the first frame and the second frame.

Aspect (9) pertains to the glass article of any one of Aspects (1) through (7), further comprising a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

Aspect (10) pertains to the glass article of any one of Aspects (1) through (9), wherein the first frame comprises a first thickness and the second frame comprises a second thickness, wherein the second thickness is less than the second thickness.

Aspect (11) pertains to the glass article of any one of Aspects (1) through (9), wherein the first frame comprises a first density and the second frame comprises a second density, the second density being less than the first density.

Aspect (12) pertains to the glass article of any one of Aspects (1) through (11), wherein the first frame and the second frame are adhered to the second major surface of the glass sheet with an adhesive layer, wherein the adhesive layer has a thickness from 0.5 mm to 1.5 mm.

Aspect (13) pertains to the glass article of any one of Aspects (1) through (12), wherein, when subjected to headform impact testing according to US DOT FMVSS 201, a headform impacting the glass sheet in a region over the mandrel does not experience a force of 80 g for more than 3 ms during deceleration.

Aspect (14) pertains to the glass article of Aspect (13), wherein the glass sheet does not break after the headform impact testing.

Aspect (15) pertains to a glass article for a vehicle interior system, comprising: a glass sheet having a first major surface and a second major surface opposite to the first major surface, wherein the glass sheet comprises a first side and a second side; a first frame disposed on the second major surface of the glass sheet on the first side of the glass sheet; a second frame disposed on the second major surface of the glass sheet on the second side of the glass sheet; a mandrel disposed between the first frame and the second frame and on the second major surface of the glass sheet; and an actuator arm connected to the second frame; wherein the second side of the glass sheet rotates about the mandrel from a first configuration to a second configuration via actuation of the actuator arm; wherein the second frame comprises a proximal end adjacent to the mandrel and a distal end located a position furthest from the mandrel; wherein the actuator arm is disposed halfway between the distal end and the proximal end or closer to the distal end; and wherein, in the first configuration, the first side forms a first angle with the second side and, in the second configuration, the first side forms a second angle with the second side, the first angle being different from the second angle.

Aspect (16) pertains to the glass article of Aspect (15), wherein the mandrel comprises a flexural rigidity and a density, wherein the flexural rigidity is in a range from 150 Pa·m$^3$ to 1000 Pa·m$^3$, and wherein the density is in a range from 1 g/cm$^3$ to 2.75 g/cm$^3$.

Aspect (17) pertains to the glass article of Aspect (16), wherein the mandrel comprises polyoxymethylene, polyether ether ketone, polyetherimide, polyamides, polyethylene terephthalate, polycarbonate, acrylic polymers, carbon fiber composites, glass fiber composites, and polytetrafluoroethylene.

Aspect (18) pertains to the glass article of Aspect (16), wherein the mandrel comprises a metal having a foamed, expanded, or honeycomb structure.

Aspect (19) pertains to the glass article of any one of Aspects (15) through (18), wherein the first side and the mandrel comprise a unitary construction.

Aspect (20) pertains to the glass article of any one of Aspects (15) through (19), further comprising a metal backing plate disposed between the glass sheet and the first and second frames, wherein the metal backing plate comprises a section of thinning located between the first frame and the second frame.

Aspect (21) pertains to the glass article of any one of Aspects (15) through (19), further comprising a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

Aspect (22) pertains to the glass article of any one of Aspects (15) through (21), wherein the first frame comprises a first thickness and the second frame comprises a second thickness, wherein the second thickness is less than the second thickness.

Aspect (23) pertains to the glass article of any one of Aspects (15) through (21), wherein the first frame comprises a first density and the second frame comprises a second density, the second density being less than the first density.

Aspect (24) pertains to the glass article of any one of Aspects (15) through (23), wherein the first frame and the second frame are adhered to the second major surface of the glass sheet with an adhesive layer, wherein the adhesive layer has a thickness from 0.5 mm to 1.5 mm.

Aspect (25) pertains to the glass article of any one of Aspects (15) through (24), wherein, when subjected to headform impact testing according to US DOT FMVSS 201, a headform impacting the glass sheet in a region over the mandrel does not experience a force of 80 g for more than 3 ms during deceleration.

Aspect (26) pertains to the glass article of Aspect (25), wherein the glass sheet does not break after the headform impact testing.

Aspect (27) pertains to the glass article of any one of Aspects (15) through (26), wherein the first side of the glass sheet comprises at least one hot-formed or cold-formed curvature.

Aspect (28) pertains to the glass article of any one of Aspects (15) through (27), wherein the first angle is about 180° and the second angle is from 190° to 290°.

Aspect (29) pertains to a glass article for a vehicle interior system, comprising: a glass sheet having a first major surface and a second major surface opposite to the first major surface, wherein the glass sheet comprises a first side and a second side; a first frame disposed on the second major surface of the glass sheet on the first side of the glass sheet; a second frame disposed on the second major surface of the glass sheet on the second side of the glass sheet; one or more metal backing plates disposed between the glass sheet and the first and second frames, the one or more metal backing plates defining a region between the first and second frames having a first thickness less than a second thickness defined by the one or more metal backing plates outside the region; a mandrel disposed between the first frame and the second frame and on the second major surface of the glass sheet; wherein the second side of the glass sheet rotates about the mandrel from a first configuration to a second configuration; wherein, in the first configuration, the first side forms a first angle with the second side and, in the second configuration, the first side forms a second angle with the second side, the first angle being different from the second angle.

Aspect (30) pertains to the glass article of Aspect (29), wherein the one or more metal backing plates comprises one metal backing plate disposed between the glass sheet and the first and second frames, wherein the one metal backing plate comprises a section of thinning located between the first frame and the second frame.

Aspect (31) pertains to the glass article of Aspect (29), wherein the one or more metal backing plates comprises a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

Aspect (32) pertains to the glass article of any one of Aspects (29) through (31), wherein the mandrel comprises a flexural rigidity and a density, wherein the flexural rigidity is in a range from 150 Pa·m³ to 1000 Pa·m³, and wherein the density is in a range from 1 g/cm³ to 2.75 g/cm³.

Aspect (33) pertains to the glass article of Aspect (32), wherein the mandrel comprises polyoxymethylene, polyether ether ketone, polyetherimide, polyamides, polyethylene terephthalate, polycarbonate, acrylic polymers, carbon fiber composites, glass fiber composites, and polytetrafluoroethylene.

Aspect (34) pertains to the glass article of Aspect (32), wherein the mandrel comprises a metal having a foamed, expanded, or honeycomb structure.

Aspect (35) pertains to the glass article of any one of Aspects (29) through (34), wherein the first side and the mandrel comprise a unitary construction.

Aspect (36) pertains to the glass article of any one of Aspects (29) through (35), further comprising an actuator arm connected to the second frame, the second frame comprising a proximal end adjacent to the mandrel and a distal end located a position furthest from the mandrel, wherein the actuator arm is configured to rotate the glass sheet between the first configuration and the second configuration.

Aspect (37) pertains to the glass article of Aspect (36), wherein the second frame comprises a midpoint between the proximal end and the distal end and wherein the actuator arm is connected to the second frame at a position from the midpoint to the distal end.

Aspect (38) pertains to the glass article of any one of Aspects (29) through (37), wherein the first frame comprises a first thickness and the second frame comprises a second thickness, wherein the second thickness is less than the second thickness.

Aspect (39) pertains to the glass article of any one of Aspects (29) through (37), wherein the first frame comprises a first density and the second frame comprises a second density, the second density being less than the first density.

Aspect (40) pertains to the glass article of any one of Aspects (29) through (39), wherein the first frame and the second frame are adhered to the second major surface of the glass sheet with an adhesive layer, wherein the adhesive layer has a thickness from 0.5 mm to 1.5 mm.

Aspect (41) pertains to the glass article of any one of Aspects (29) through (40), wherein, when subjected to headform impact testing according to US DOT FMVSS 201, a headform impacting the glass sheet in a region over the mandrel does not experience a force of 80 g for more than 3 ms during deceleration.

Aspect (42) pertains to the glass article of any one of Aspects (41), wherein the glass sheet does not break after the headform impact testing.

Aspect (43) pertains to the glass article of any one of Aspects (29) through (42), wherein the first angle is about 180° and the second angle is from 190° to 290°.

Aspect (44) pertains to a glass article for a vehicle interior system, comprising: a glass sheet having a first major surface and a second major surface opposite to the first major surface, wherein the glass sheet comprises a first side and a second side; a first frame disposed on the second major surface of the glass sheet on the first side of the glass sheet, the first frame comprising a first thickness and being comprised of a first material having a first density and a first structure; a second frame disposed on the second major surface of the glass sheet on the second side of the glass sheet, the second frame comprising at least one of: a second thickness less than the first thickness; a second material having a second density less than the first density; or the first material having a second structure different from the first structure; a mandrel disposed between the first frame and the second frame and on the second major surface of the glass sheet; wherein the second side of the glass sheet rotates about the mandrel from a first configuration to a second configuration; and wherein, in the first configuration, the first side forms a first angle with the second side and, in the second configuration, the first side forms a second angle with the second side, the first angle being different from the second angle.

Aspect (45) pertains to the glass article of Aspect (44), wherein the first frame comprises a first structure of a solid, fully dense material and the second frame comprises a second structure of a foamed, expanded, or honeycombed structure of the first material.

Aspect (46) pertains to the glass article of Aspect (44) or Aspect (45), wherein the mandrel comprises a flexural rigidity and a density, wherein the flexural rigidity is in a range from 150 Pa·m³ to 1000 Pa·m³, and wherein the density is in a range from 1 g/cm³ to 2.75 g/cm³.

Aspect (47) pertains to the glass article of Aspect (46), wherein the mandrel comprises polyoxymethylene, polyether ether ketone, polyetherimide, polyamides, polyethylene terephthalate, polycarbonate, acrylic polymers, carbon fiber composites, glass fiber composites, and polytetrafluoroethylene.

Aspect (48) pertains to the glass article of Aspect (47), wherein the mandrel comprises a metal having a foamed, expanded, or honeycomb structure.

Aspect (49) pertains to the glass article of any one of Aspects (44) through (48), wherein the first side and the mandrel comprise a unitary construction.

Aspect (50) pertains to the glass article of any one of Aspects (44) through (49), further comprising an actuator arm connected to the second frame, the second frame comprising a proximal end adjacent to the mandrel and a distal end located a position furthest from the mandrel, wherein the actuator arm is configured to rotate the glass sheet between the first configuration and the second configuration.

Aspect (51) pertains to the glass article of Aspect (50), wherein the second frame comprises a midpoint between the proximal end and the distal end and wherein the actuator arm is connected to the second frame at a position from the midpoint to the distal end.

Aspect (52) pertains to the glass article of any one of Aspects (44) through (51), further comprising a metal backing plate disposed between the glass sheet and the first and second frames, wherein the metal backing plate comprises a section of thinning located between the first frame and the second frame.

Aspect (53) pertains to the glass article of any one of Aspects (44) through (51), further comprising a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

Aspect (54) pertains to the glass article of any one of Aspects (44) through (53), wherein the first frame and the second frame are adhered to the second major surface of the glass sheet with an adhesive layer, wherein the adhesive layer has a thickness from 0.5 mm to 1.5 mm.

Aspect (55) pertains to the glass article of any one of Aspects (44) through (54), wherein, when subjected to headform impact testing according to US DOT FMVSS 201, a headform impacting the glass sheet in a region over the mandrel does not experience a force of 80 g for more than 3 ms during deceleration.

Aspect (56) pertains to the glass article of Aspect (55), wherein the glass sheet does not break after the headform impact testing.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article for a vehicle interior system, comprising:
a glass sheet having a first major surface and a second major surface opposite to the first major surface, wherein the glass sheet comprises a first side and a second side;
a first frame disposed on the second major surface of the glass sheet on the first side of the glass sheet;
a second frame disposed on the second major surface of the glass sheet on the second side of the glass sheet;
a mandrel disposed between the first frame and the second frame and on the second major surface of the glass sheet, the mandrel comprising a flexural rigidity of at least 150 Pa·m$^3$ and a density of greater than zero and at most 2.75 g/cm$^3$;
wherein the second side of the glass sheet rotates about the mandrel from a first configuration to a second configuration;
wherein, in the first configuration, the first side forms a first angle with the second side and, in the second configuration, the first side forms a second angle with the second side, the first angle being different from the second angle.

2. The glass article of claim 1, wherein the flexural rigidity is up to 1000 Pa·m$^3$ and wherein the density is at least 1 g/cm$^3$.

3. The glass article of claim 1, wherein the mandrel comprises polyoxymethylene, polyether ether ketone, polyetherimide, polyamides, polyethylene terephthalate, polycarbonate, acrylic polymers, carbon fiber composites, glass fiber composites, and polytetrafluoroethylene.

4. The glass article of claim 1, wherein the mandrel comprises a metal having a foamed, expanded, or honeycomb structure.

5. The glass article of claim 1, wherein the first side and the mandrel comprise a unitary construction.

6. The glass article of claim 1, further comprising an actuator arm connected to the second frame, the second frame comprising a proximal end adjacent to the mandrel and a distal end located a position furthest from the mandrel, wherein the actuator arm is configured to rotate the glass sheet between the first configuration and the second configuration.

7. The glass article of claim 6, wherein the second frame comprises a midpoint between the proximal end and the distal end and wherein the actuator arm is connected to the second frame at a position from the midpoint to the distal end.

8. The glass article of claim 1, further comprising a metal backing plate disposed between the glass sheet and the first and second frames, wherein the metal backing plate comprises a section of thinning located between the first frame and the second frame.

9. The glass article of claim 1, further comprising a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

10. The glass article of claim 1, wherein the first frame comprises a first thickness and the second frame comprises a second thickness, wherein the second thickness is less than the first thickness.

11. The glass article of claim 1, wherein the first frame comprises a first density and the second frame comprises a second density, the second density being less than the first density.

12. The glass article of claim 1, wherein the first frame and the second frame are adhered to the second major surface of the glass sheet with an adhesive layer, wherein the adhesive layer has a thickness from 0.5 mm to 1.5 mm.

13. The glass article of claim 1, wherein, when subjected to headform impact testing according to US DOT FMVSS 201, a headform impacting the glass sheet in a region over the mandrel does not experience a force of 80 g for more than 3 ms during deceleration.

14. The glass article of claim 13, wherein the glass sheet does not break after the headform impact testing.

15. A glass article for a vehicle interior system, comprising:

a glass sheet having a first major surface and a second major surface opposite to the first major surface, wherein the glass sheet comprises a first side and a second side;

a first frame disposed on the second major surface of the glass sheet on the first side of the glass sheet;

a second frame disposed on the second major surface of the glass sheet on the second side of the glass sheet;

a mandrel disposed between the first frame and the second frame and on the second major surface of the glass sheet, the mandrel having a flexural rigidity in a range from 150 Pa·m³ to 1000 Pa·m³; and an actuator arm connected to the second frame;

wherein the second side of the glass sheet rotates about the mandrel from a first configuration to a second configuration via actuation of the actuator arm;

wherein the second frame comprises a proximal end adjacent to the mandrel and a distal end located a position furthest from the mandrel;

wherein the actuator arm is disposed halfway between the distal end and the proximal end or closer to the distal end; and wherein, in the first configuration, the first side forms a first angle with the second side and, in the second configuration, the first side forms a second angle with the second side, the first angle being different from the second angle.

16. The glass article of claim 15, wherein the mandrel comprises a density in a range from 1 g/cm³ to 2.75 g/cm³.

17. The glass article of claim 16, wherein the mandrel comprises a metal having a foamed, expanded, or honeycomb structure.

18. The glass article of claim 15, further comprising a first metal backing plate disposed between the glass sheet and the first and second frames, a second metal backing plate disposed between the first metal backing plate and the first frame, and a third metal backing plate disposed between the first metal backing plate and the second frame, wherein a gap is provided between the second metal backing plate and the third metal backing plate at a location between the first frame and the second frame.

19. The glass article of claim 15, wherein at least one of:

the first frame comprises a first thickness and the second frame comprises a second thickness, wherein the second thickness is less than the first thickness, and the first frame comprises a first density and the second frame comprises a second density, the second density being less than the first density.

20. A glass article for a vehicle interior system, comprising:

a glass sheet having a first major surface and a second major surface opposite to the first major surface, wherein the glass sheet comprises a first side and a second side;

a first frame disposed on the second major surface of the glass sheet on the first side of the glass sheet;

a second frame disposed on the second major surface of the glass sheet on the second side of the glass sheet;

a mandrel disposed between the first frame and the second frame and on the second major surface of the glass sheet; and one or more backing plates disposed between the glass sheet and the first and second frames, the one or more backing plates comprising a section of thinning located between the first frame and the second frame;

wherein the second side of the glass sheet rotates about the mandrel from a first configuration to a second configuration;

wherein, in the first configuration, the first side forms a first angle with the second side and, in the second configuration, the first side forms a second angle with the second side, the first angle being different from the second angle.

* * * * *